US010746208B2

(12) United States Patent
Logan et al.

(10) Patent No.: US 10,746,208 B2
(45) Date of Patent: Aug. 18, 2020

(54) METHOD AND SYSTEM FOR NON-INTRUSIVE PIPELINE TESTING

(71) Applicant: Hifi Engineering Inc., Calgary (CA)

(72) Inventors: Derek Logan, Calgary (CA); John Hull, Calgary (CA); Seyed Ehsan Jalilian, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 0 days.

(21) Appl. No.: 16/063,659

(22) PCT Filed: Dec. 16, 2016

(86) PCT No.: PCT/CA2016/051504
§ 371 (c)(1),
(2) Date: Jun. 18, 2018

(87) PCT Pub. No.: WO2017/100946
PCT Pub. Date: Jun. 22, 2017

(65) Prior Publication Data
US 2019/0003499 A1  Jan. 3, 2019

Related U.S. Application Data

(60) Provisional application No. 62/269,773, filed on Dec. 18, 2015.

(51) Int. Cl.
*F16B 2/06* (2006.01)
*G01N 29/00* (2006.01)
(Continued)

(52) U.S. Cl.
CPC ............... *F16B 2/06* (2013.01); *G01B 11/16* (2013.01); *G01H 9/004* (2013.01); *G01L 1/246* (2013.01);
(Continued)

(58) Field of Classification Search
CPC ........ G02B 6/34; G02B 6/46; G02B 6/29356; F16B 2/06; G01M 5/0025; G01M 5/0041;
(Continued)

(56) References Cited

U.S. PATENT DOCUMENTS 7,646,945 B2  1/2010  Jones et al.
7,703,331 B2  4/2010  Magne et al.
(Continued)

FOREIGN PATENT DOCUMENTS

CA  2335469 A1  1/2000
CA  2790841 A1  10/2010
(Continued)

OTHER PUBLICATIONS

International Search Report and Written Opinion of the International Searching Authority, dated Mar. 1, 2017, for corresponding International Application No. PCT/CA2016/051504, 8 pages.

*Primary Examiner* — Ryan A Lepisto
*Assistant Examiner* — Erin D Chiem
(74) *Attorney, Agent, or Firm* — Klarquist Sparkman, LLP

(57) ABSTRACT

A method for non-intrusive pipeline testing involves constructing the pipeline at a construction location that is above ground, affixing an optical fiber along a surface of a length of the pipeline that is at the construction location, measuring dynamic strain experienced by the length of the pipeline by performing optical interferometry using the optical fiber, and moving the length of the pipeline from the construction location to a different installation location. The optical fiber includes at least one pair of fiber Bragg gratings ("FBGs") tuned to reflect substantially identical wavelengths with a segment of the optical fiber extending between the FBGs.

10 Claims, 17 Drawing Sheets

(51) Int. Cl.
    *G01M 3/38*      (2006.01)
    *G01M 5/00*      (2006.01)
    *G01M 11/08*      (2006.01)
    *G01N 29/24*      (2006.01)
    *G01L 1/24*      (2006.01)
    *G01H 9/00*      (2006.01)
    *G01B 11/16*      (2006.01)
    *G02B 6/46*      (2006.01)
    *G02B 6/293*      (2006.01)
    *G02B 6/34*      (2006.01)

(52) U.S. Cl.
    CPC ............ *G01M 3/38* (2013.01); *G01M 5/0025* (2013.01); *G01M 5/0041* (2013.01); *G01M 5/0091* (2013.01); *G01M 11/085* (2013.01); *G01N 29/00* (2013.01); *G01N 29/2418* (2013.01); *F16L 2201/30* (2013.01); *G01N 2291/02827* (2013.01); *G01N 2291/2634* (2013.01); *G02B 6/29356* (2013.01); *G02B 6/34* (2013.01); *G02B 6/46* (2013.01)

(58) Field of Classification Search
    CPC ............. G01M 5/0091; G01M 11/085; G01M 11/086; G01L 1/246; G01H 9/004; G01B 11/16; G01N 2291/02827; G01N 2291/2634; F16L 2201/30; F17D 3/01
    See application file for complete search history.

(56) References Cited

U.S. PATENT DOCUMENTS

2012/0155508 A1*    6/2012    Dria ...................... E21B 43/164
                                                                                    374/107
2014/0345388 A1*    11/2014    Den Boer ................ G01V 1/40
                                                                                    73/655

FOREIGN PATENT DOCUMENTS

GB            894867 A      4/1960
WO    WO2013/102252 A1      7/2013

* cited by examiner

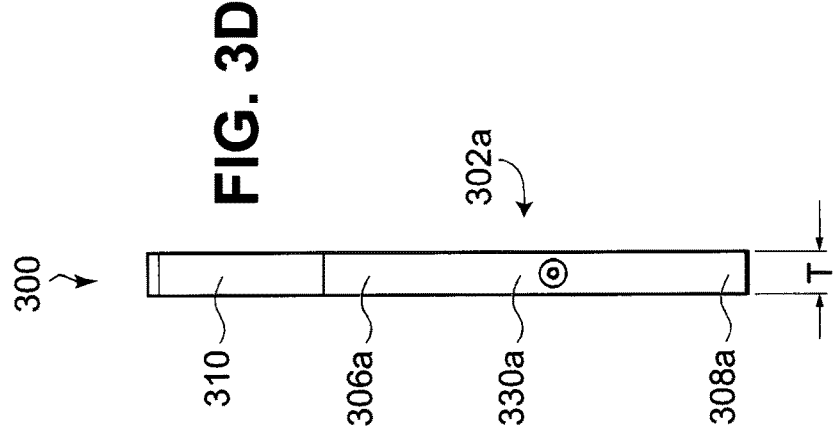
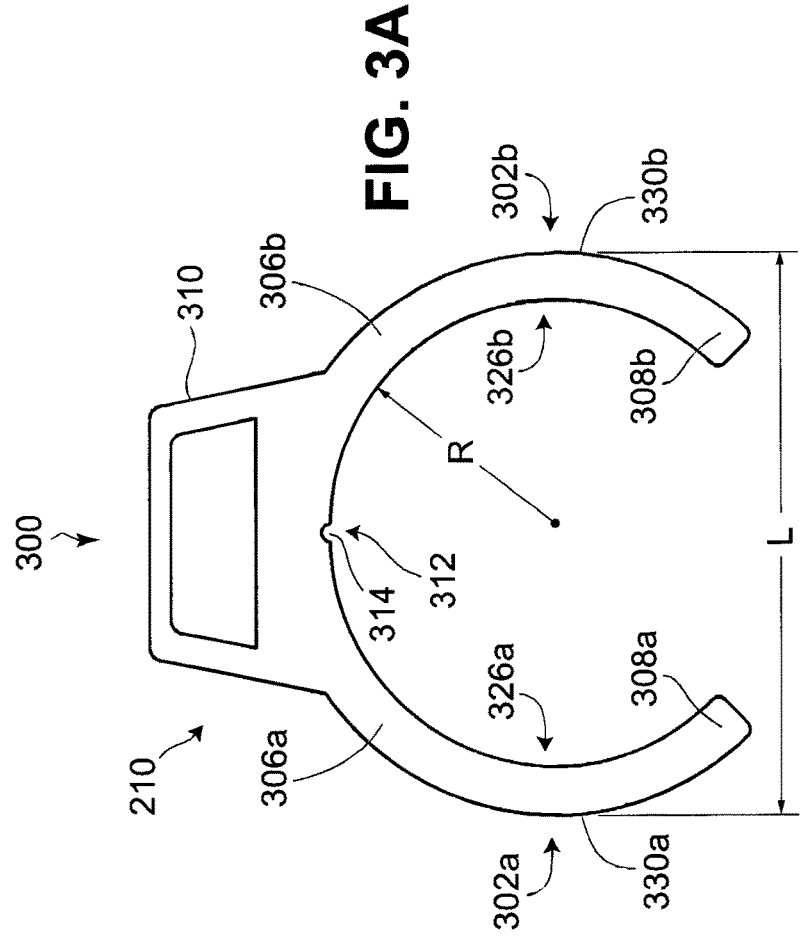
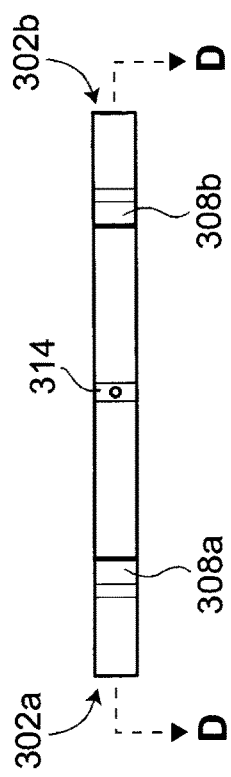

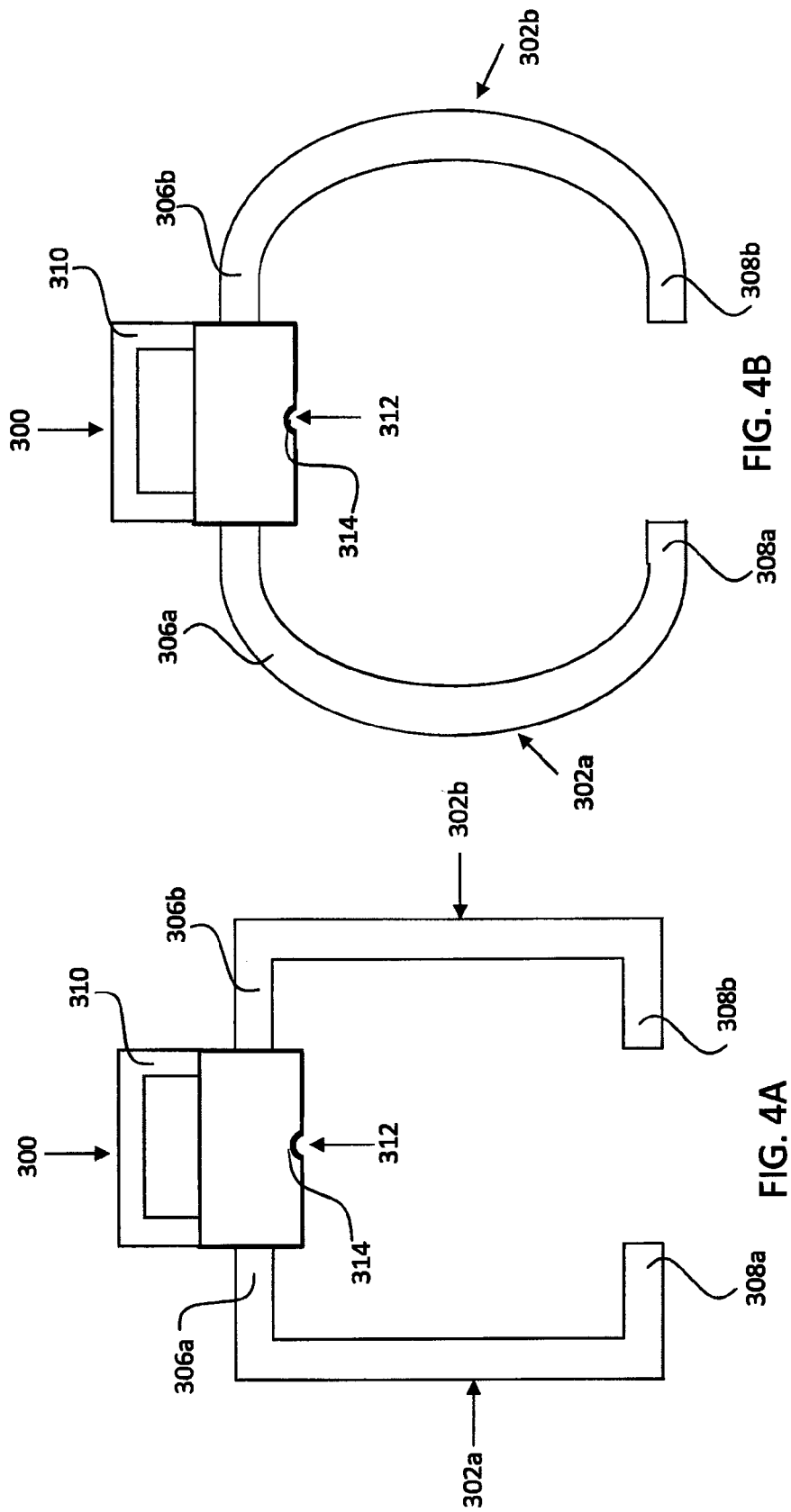

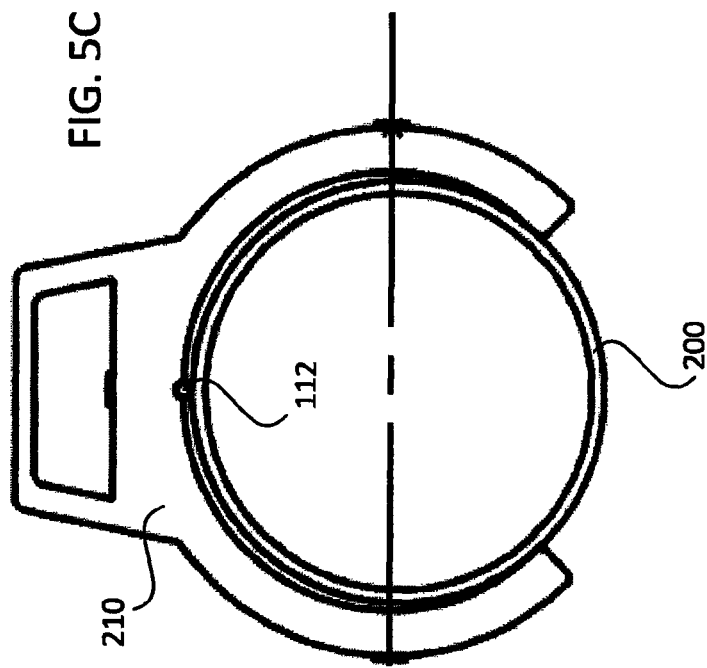
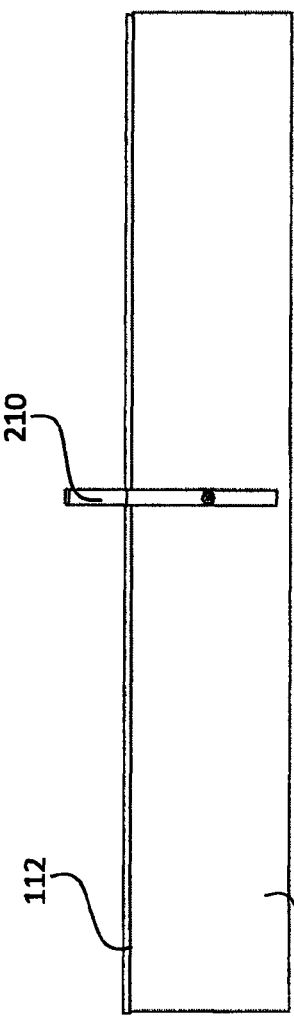
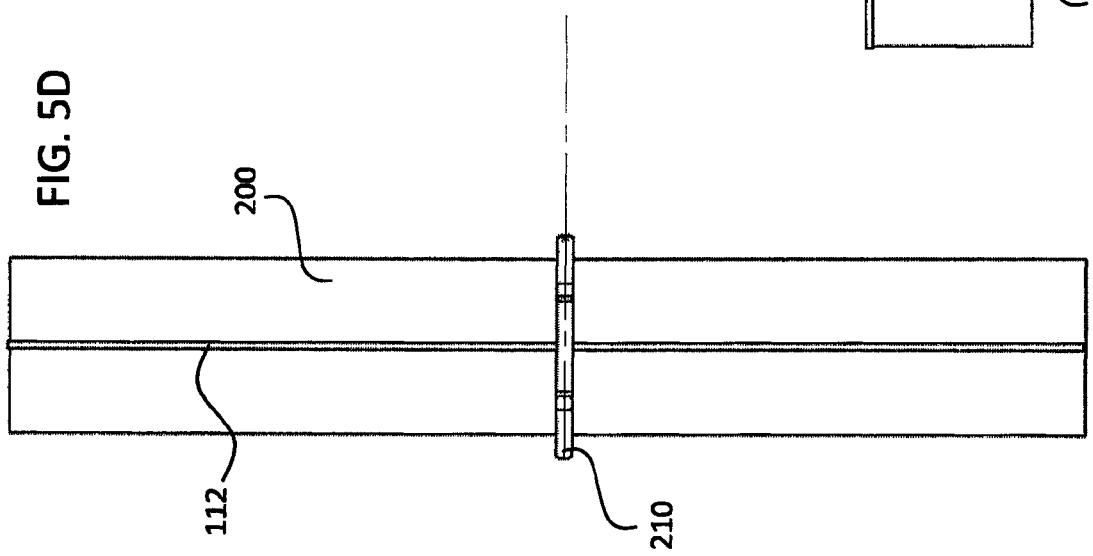

METHOD AND SYSTEM FOR NON-INTRUSIVE PIPELINE TESTING

CROSS REFERENCE TO RELATED APPLICATIONS

This is the U.S. National Stage of International Application No. PCT/CA2016/051504, filed Dec. 16, 2016, which in turn claims the benefit of and priority to U.S. Provisional Application No. 62/269,773, filed Dec. 18, 2015. The provisional application is incorporated herein in its entirety.

TECHNICAL FIELD

The present disclosure is directed at methods, systems, and techniques for non-intrusive pipeline testing.

BACKGROUND

Optical interferometry is a technique in which two separate light pulses, a sensing pulse and a reference pulse, are generated and interfere with each other. When optical interferometry is used for fiber optic sensing applications, the sensing and reference pulses are at least partially reflected back towards an optical receiver. The nature of the interference observed at the optical receiver provides information on the optical path length the pulses traveled, which in turn provides information on parameters such as the strain the optical fiber experienced.

There exists a desire to use the optical fiber to measure strain forces experienced by a pipeline.

SUMMARY

According to a first aspect, there is provided a method for non-intrusive pipeline testing. The method comprises constructing the pipeline at a construction location that is above ground; affixing an optical fiber along a surface of a length of the pipeline that is at the construction location, wherein the optical fiber comprises at least one pair of fiber Bragg gratings ("FBGs") tuned to reflect substantially identical wavelengths with a segment of the optical fiber extending between the FBGs; measuring dynamic strain experienced by the length of the pipeline by performing optical interferometry using the optical fiber; and moving the length of the pipeline from the construction location to a different installation location.

The installation location may comprise a trench.

The method may further comprise prior to moving the length of the pipeline, removing the optical fiber from the length of the pipeline.

The fiber may remain affixed to the length of the pipeline after the length of the pipeline is moved to the installation location.

The fiber may extend substantially linearly along the length of the pipeline.

The fiber may be helically wrapped around the pipeline.

The fiber may be clamped to the length of the pipeline.

The pipeline may comprise at least two tubulars attached together at a junction, and wherein the optical fiber is overlaid on the junction.

The dynamic strain that is measured may comprise an instantaneous dynamic strain measurement. The method may also further comprise determining whether the instantaneous dynamic strain measurement exceeds an instantaneous dynamic strain alert threshold; and when the instantaneous dynamic strain measurement exceeds the instantaneous dynamic strain alert threshold, generating an instantaneous dynamic strain alert.

The method may further comprise performing a pressure test on the length of the pipeline in response to the instantaneous dynamic strain alert while the length of the pipeline is at the construction location.

The method may further comprise repairing the length of the pipeline following the instantaneous dynamic strain alert while the length of the pipeline is at the construction location.

The dynamic strain that is measured may comprise a cumulative dynamic strain measurement, and the method may further comprise determining whether the cumulative dynamic strain measurement exceeds a cumulative dynamic strain alert threshold; and when the cumulative dynamic strain measurement exceeds the cumulative dynamic strain alert threshold, generating a cumulative dynamic strain alert.

The method may further comprise performing a pressure test on the length of the pipeline in response to the cumulative dynamic strain alert while the length of the pipeline is at the construction location.

The method may further comprise repairing the length of the pipeline following the cumulative dynamic strain alert while the length of the pipeline is at the construction location.

The optical fiber may be affixed to the pipeline while the pipeline is being constructed.

The optical fiber may comprise first and second pairs of the FBGs, wherein the FBGs of the first pair are tuned to a first wavelength and the FBGs of the second pair are tuned to a second wavelength different from the first wavelength.

The optical fiber may extend along an interior of the pipeline.

The optical fiber may be affixed to an internal surface of the pipeline.

A liner may extend along the interior of the pipeline, and the optical fiber may be embedded in the lining.

An interior pipeline may extend along the interior of the pipeline within which the liner extends, and the lining may be located between and in contact with the pipelines.

A clamp may be used for clamping. The clamp may comprise a body portion coupled at one end to a first arm and at an opposing end to a second arm, the clamp having a resilient portion to permit the clamp to elastically deform from a closed state in which the clamp is fastened around the pipeline to an open state in which the clamp is radially moveable off the pipeline, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the pipeline when the clamp is fastened around the pipeline, and a clamping mechanism operable to extend at least part of the clamping surface towards the pipeline when the clamp is secured to the pipeline to increase a clamping force applied by the clamping surface.

The clamping surface may comprise a groove for receiving the portion of fiber.

The clamping mechanism may comprise a bore formed in the body portion and terminating at the clamping surface, and a fastener extending through the bore and having an end portion forming the at least part of the clamping surface which is operable to extend towards the pipeline to increase the clamping force.

An outer surface of the fastener and an inner surface of the bore may comprise cooperating screw threads such that rotating the fastener in one direction with respect to the bore extends the end portion of the fastener towards the pipeline to increase the clamping force, and rotating the fastener in the other direction with respect to the bore retracts the end portion of the fastener away from the pipeline to decrease the clamping force.

The first arm may comprise a further clamping surface to clamp another portion of optical fiber against the pipeline when the clamp is fastened around the pipeline, and a further clamping mechanism operable to extend at least part of the further clamping surface towards the pipeline to increase a clamping force applied by the further clamping surface.

The further clamping surface may comprise a groove for receiving the other portion of optical fiber.

The further clamping mechanism may comprise a further bore formed in the at least one arm and terminating at the further clamping surface, and a further fastener extending through the further bore and having an end portion forming the at least part of the further clamping surface which is operable to extend towards the pipeline to increase the clamping force applied by the further clamping surface.

An outer surface of the further fastener and an inner surface of the further bore may comprise cooperating screw threads such that rotating the further fastener in one direction with respect to the further bore extends the end portion of the further fastener towards the pipeline to increase the clamping force, and rotating the further fastener in the other direction with respect to the further bore retracts the end portion of the further fastener away from the pipeline to decrease the clamping force.

The second arm may comprises an additional clamping surface to clamp another portion of optical fiber against the pipeline when the clamp is fastened around the pipeline, and an additional clamping mechanism operable to extend at least part of the additional clamping surface towards the pipeline to increase a clamping force applied by the additional clamping surface.

The additional clamping surface may comprise a groove for receiving the other portion of optical fiber.

The additional clamping mechanism may comprise an additional bore formed in the at least one arm and terminating at the additional clamping surface, and an additional fastener extending through the additional bore and having an end portion forming the at least part of the additional clamping surface which is operable to extend towards the pipeline to increase the clamping force applied by the additional clamping surface.

An outer surface of the additional fastener and an inner surface of the additional bore may comprise cooperating screw threads such that rotating the additional fastener in one direction with respect to the additional bore extends the end portion of the additional fastener towards the pipeline to increase the clamping force, and rotating the additional fastener in the other direction with respect to the additional bore retracts the end portion of the additional fastener away from the pipeline to decrease the clamping force.

The clamping surface may be equidistant from the further clamping surface and the additional clamping surface.

The body portion may further comprise a handle.

The resilient portion may comprise each of the first and second arms.

The resilient portion may comprise the body portion.

Each of the first and second arms may be arcuate, and the first and second arms, with the body portion, may define a curve of greater than 180 degrees.

The first and second arms, with the body portion, may define a curve of between 240 and 300 degrees.

A diameter of the curve may be 320 millimeters.

The clamp may be fabricated from an electrically insulating material.

The groove may be offset with respect to a longitudinal axis of the clamp.

The pipeline may be magnetic and the clamp may comprise a body portion coupled at one end to a first arm and at an opposing end to a second arm, the clamp having a resilient portion to permit the clamp to elastically deform from a closed state in which the clamp is fastened around the pipeline to an open state in which the clamp is radially moveable off the pipeline, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the pipeline when the clamp is fastened around the pipeline, and at least one magnet positioned so as to attract the clamping surface towards the pipeline.

The at least one magnet may be completely enclosed within the at least one of the body portion, the first arm and the second arm.

The at least one magnet may comprise an array of magnets.

The at least one magnet may comprise a rare earth magnet.

Each of the body portion, the first arm and the second arm may comprise a separate clamping surface and a separate at least one magnet.

According to another aspect, there is provided a portable inspection system for non-intrusive pipeline testing, the system comprising a fiber reel on which is wound optical fiber of which a portion is affixed along a surface of a length of the pipeline, the portion of the optical fiber affixed to the length of the pipeline comprising at least one pair of fiber Bragg gratings ("FBGs") tuned to reflect substantially identical wavelengths with a segment of the optical fiber extending between the FBGs; an optical interrogator optically coupled to the optical fiber and comprising a laser source and a photodetector, wherein the interrogator is configured to perform interferometry by shining laser light along the optical fiber and detecting light reflected by the FBGs, and wherein the interrogator outputs dynamic strain measurements based on interferometry performed on the reflected light; and a signal processing unit electrically coupled to the optical interrogator, the signal processing unit comprising a processor and a computer readable medium communicatively coupled to the processor, the computer readable medium having stored thereon computer program code that, when executed by the processor, causes the signal processing unit to determine an amount of dynamic strain experienced by the length of the pipeline from the dynamic strain measurements that the optical interrogator outputs.

According to another aspect, there is provided a system for non-intrusive pipeline testing, the system comprising a pipeline being constructed at a construction location that is above ground; a fiber reel on which is wound optical fiber of which a portion is affixed along a surface of a length of the pipeline, the portion of the optical fiber affixed to the length of the pipeline comprising at least one pair of fiber Bragg gratings ("FBGs") tuned to reflect substantially identical wavelengths with a segment of the optical fiber extending between the FBGs; an optical interrogator optically coupled to the optical fiber and comprising a laser source and a photodetector, wherein the interrogator is configured to perform interferometry by shining laser light along the optical fiber and detecting light reflected by the FBGs, and wherein the interrogator outputs dynamic strain measurements based on interferometry performed on the reflected light; and a signal processing unit electrically coupled to the optical interrogator, the signal processing unit comprising a processor and a computer readable medium communicatively coupled to the processor, the computer readable medium having stored thereon computer program code that, when executed by the processor, causes the signal processing unit to determine an amount of dynamic strain experienced by the length of the pipeline from the dynamic strain measurements that the optical interrogator outputs.

The fiber may extend substantially linearly along the length of the pipeline.

The fiber may be helically wrapped around the pipeline.

The system may further comprise a clamp that clamps the fiber to the length of the pipeline.

The pipeline may comprise at least two tubulars attached together at a junction, and wherein the optical fiber is overlaid on the junction.

The dynamic strain that is measured may comprise an instantaneous dynamic strain measurement, and the computer program code, when executed by the processor, may further cause the signal processing unit to determine whether the instantaneous dynamic strain measurement exceeds an instantaneous dynamic strain alert threshold; and when the instantaneous dynamic strain measurement exceeds the instantaneous dynamic strain alert threshold, generate an instantaneous dynamic strain alert.

The dynamic strain that is measured may comprise a cumulative dynamic strain measurement, and the computer program code, when executed by the processor, may further cause the signal processing unit to determine whether the cumulative dynamic strain measurement exceeds a cumulative dynamic strain alert threshold; and when the cumulative dynamic strain measurement exceeds the cumulative dynamic strain alert threshold, generate a cumulative dynamic strain alert.

The optical fiber may comprise first and second pairs of the FBGs, wherein the FBGs of the first pair are tuned to a first wavelength and the FBGs of the second pair are tuned to a second wavelength different from the first wavelength.

The optical fiber may extend along an interior of the pipeline.

The optical fiber may be affixed to an internal surface of the pipeline.

The system may further comprise a liner extending along the interior of the pipeline, and wherein the optical fiber is embedded in the lining.

The system may further comprise an interior pipeline extending along the interior of the pipeline within which the liner extends, and wherein the lining is located between and in contact with the pipelines.

The clamp may comprise a body portion coupled at one end to a first arm and at an opposing end to a second arm, the clamp having a resilient portion to permit the clamp to elastically deform from a closed state in which the clamp is fastened around the pipeline to an open state in which the clamp is radially moveable off the pipeline, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the pipeline when the clamp is fastened around the pipeline, and a clamping mechanism operable to extend at least part of the clamping surface towards the pipeline when the clamp is secured to the pipeline to increase a clamping force applied by the clamping surface.

The clamping surface may comprise a groove for receiving the portion of fiber.

The clamping mechanism may comprise a bore formed in the body portion and terminating at the clamping surface, and a fastener extending through the bore and having an end portion forming the at least part of the clamping surface which is operable to extend towards the pipeline to increase the clamping force.

An outer surface of the fastener and an inner surface of the bore may comprise cooperating screw threads such that rotating the fastener in one direction with respect to the bore extends the end portion of the fastener towards the pipeline to increase the clamping force, and rotating the fastener in the other direction with respect to the bore retracts the end portion of the fastener away from the pipeline to decrease the clamping force.

The first arm may comprise a further clamping surface to clamp another portion of optical fiber against the pipeline when the clamp is fastened around the pipeline, and a further clamping mechanism operable to extend at least part of the further clamping surface towards the pipeline to increase a clamping force applied by the further clamping surface.

The further clamping surface may comprise a groove for receiving the other portion of optical fiber.

The further clamping mechanism may comprise a further bore formed in the at least one arm and terminating at the further clamping surface, and a further fastener extending through the further bore and having an end portion forming the at least part of the further clamping surface which is operable to extend towards the pipeline to increase the clamping force applied by the further clamping surface.

An outer surface of the further fastener and an inner surface of the further bore may comprise cooperating screw threads such that rotating the further fastener in one direction with respect to the further bore extends the end portion of the further fastener towards the pipeline to increase the clamping force, and rotating the further fastener in the other direction with respect to the further bore retracts the end portion of the further fastener away from the pipeline to decrease the clamping force.

The second arm may comprise an additional clamping surface to clamp another portion of optical fiber against the pipeline when the clamp is fastened around the pipeline, and an additional clamping mechanism operable to extend at least part of the additional clamping surface towards the pipeline to increase a clamping force applied by the additional clamping surface.

The additional clamping surface may comprise a groove for receiving the other portion of optical fiber.

The additional clamping mechanism may comprise an additional bore formed in the at least one arm and terminating at the additional clamping surface, and an additional fastener extending through the additional bore and having an end portion forming the at least part of the additional clamping surface which is operable to extend towards the pipeline to increase the clamping force applied by the additional clamping surface.

An outer surface of the additional fastener and an inner surface of the additional bore may comprise cooperating screw threads such that rotating the additional fastener in one direction with respect to the additional bore extends the end portion of the additional fastener towards the pipeline to increase the clamping force, and rotating the additional fastener in the other direction with respect to the additional bore retracts the end portion of the additional fastener away from the pipeline to decrease the clamping force.

The clamping surface may be equidistant from the further clamping surface and the additional clamping surface.

The body portion may further comprise a handle.

The resilient portion may comprise each of the first and second arms.

The resilient portion may comprises the body portion.

Each of the first and second arms may be arcuate, and the first and second arms, with the body portion, may define a curve of greater than 180 degrees.

The first and second arms, with the body portion, may define a curve of between 240 and 300 degrees.

A diameter of the curve may be 320 millimeters.

The clamp may be fabricated from an electrically insulating material.

The groove may be offset with respect to a longitudinal axis of the clamp.

The pipeline may be magnetic and the clamp comprises a body portion coupled at one end to a first arm and at an opposing end to a second arm, the clamp having a resilient portion to permit the clamp to elastically deform from a closed state in which the clamp is fastened around the pipeline to an open state in which the clamp is radially moveable off the pipeline, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the pipeline when the clamp is fastened around the pipeline, and at least one magnet positioned so as to attract the clamping surface towards the pipeline.

The at least one magnet may be completely enclosed within the at least one of the body portion, the first arm and the second arm.

The at least one magnet may comprise an array of magnets.

The at least one magnet may comprise a rare earth magnet.

Each of the body portion, the first arm and the second arm may comprise a separate clamping surface and a separate at least one magnet.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 3A to 3F are schematics that depict an example clamp comprising part of an embodiment of the system for non-intrusive pipeline testing, wherein FIG. 3A is a front view, FIG. 3B is a perspective view, FIG. 3C is a cross-section view taken along line D-D of FIG. 3E, FIG. 3D is a side view, FIG. 3E is a bottom view, and FIG. 3F is an enlarged view of region B of FIG. 3B.

FIGS. 3G and 3H are schematics that depict the clamp in accordance with another embodiment, wherein FIG. 3G is a perspective view of the clamp and FIG. 3H is a perspective view of the clamp when clamping an optical fiber to the pipeline.

FIGS. 4A and 4B are schematics that depict the clamp in accordance with other embodiments, wherein FIG. 4A depicts an embodiment having arms with straight portions, and FIG. 4B depicts an embodiment having arms with both straight and curved portions.

FIGS. 5A to 5D are schematics that depict the example clamp of FIGS. 3A to 3F when clamping an optical fiber to the pipeline, wherein FIG. 5A is a perspective view, FIG. 5B is a side view, FIG. 5C is a front view, and FIG. 5D is a plan view.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Optical Interferometry

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. Optical interferometry has a variety of applications, one of which is being used to detect dynamic strain.

Figure 1A:
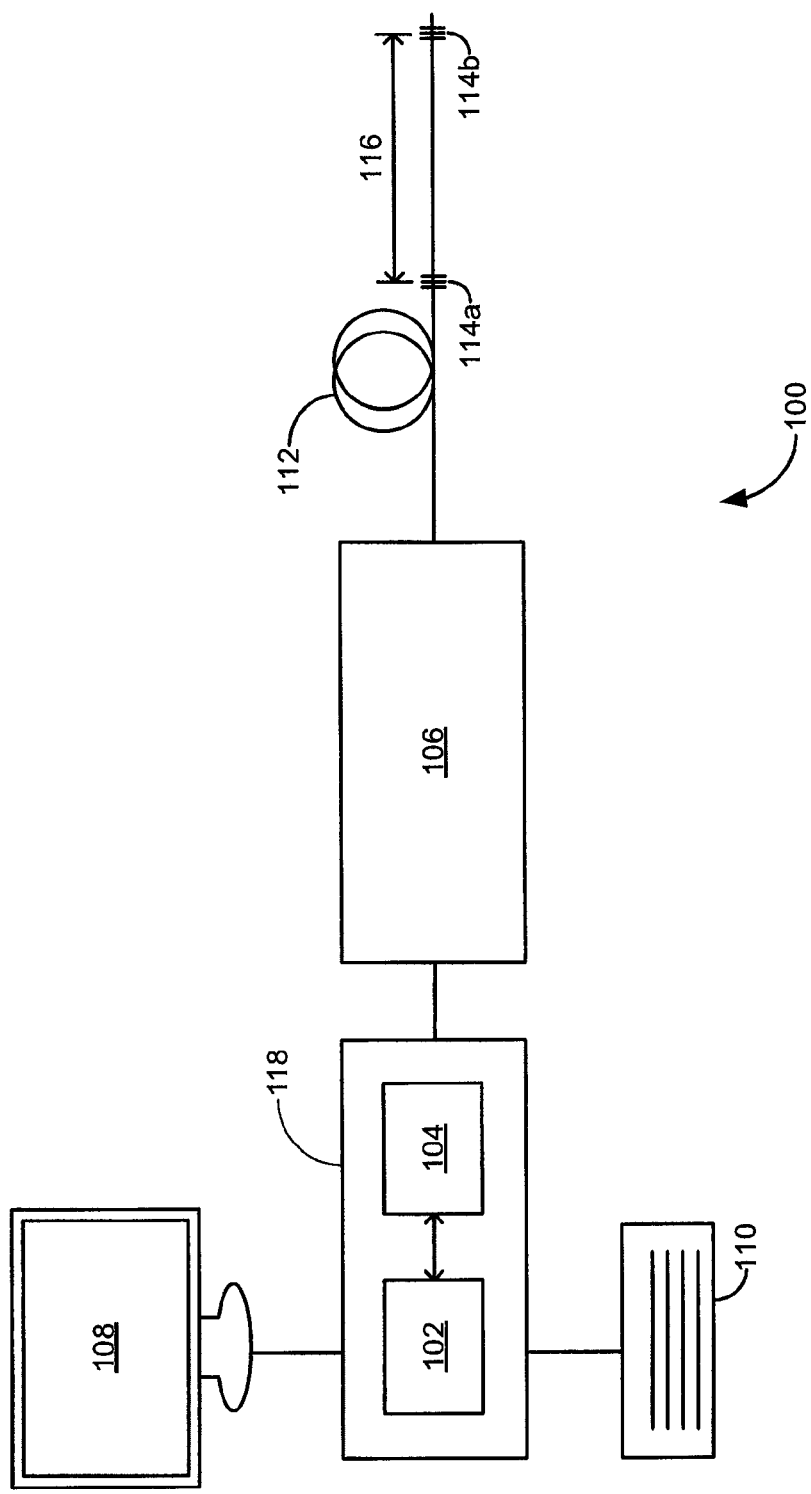
FIG. 1A is a block diagram of an embodiment of a system for performing optical interferometry using fiber Bragg gratings ("FBGs"), the system usable for non-intrusive pipeline testing.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs 114 extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has stored on it program code to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
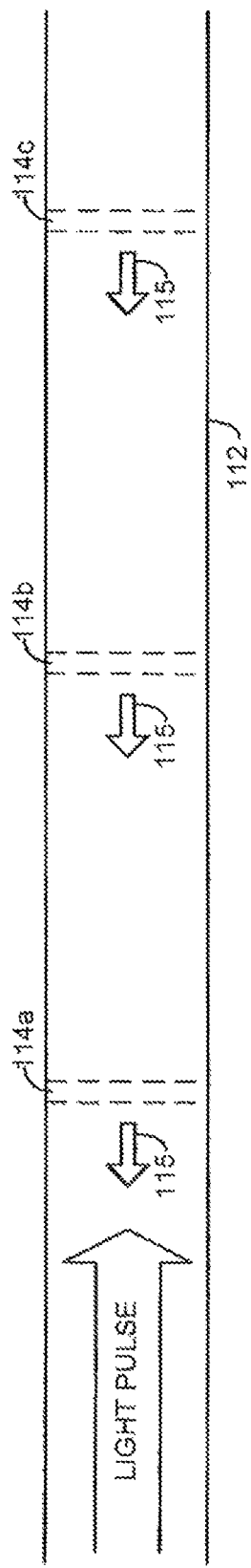
FIG. 1B is a schematic that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\theta = \frac{2\pi nL}{\lambda}$$

where n is the index of refraction of the optical fiber; L is the physical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 1C:
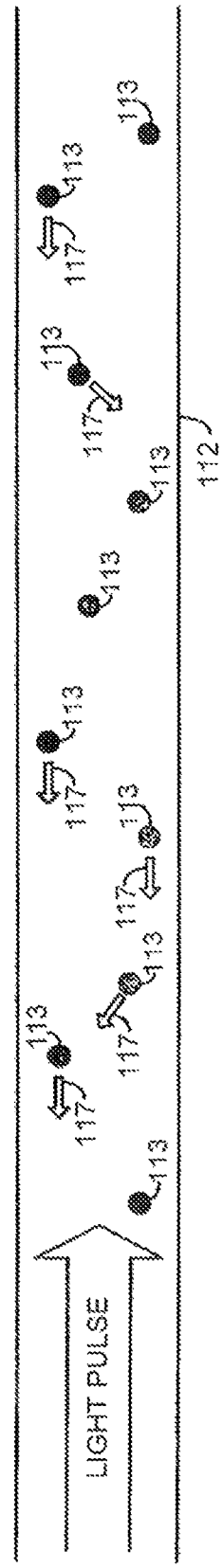
FIG. 1C is a schematic that depicts how a light pulse interacts with impurities in an optical fiber that results in scattered laser light due to Rayleigh scattering, which is used for distributed acoustic sensing ("DAS").

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. Accordingly, DAS may be performed using fiber 112 without any FBGs.

One application of the above-described technology is to measure strain (e.g. dynamic strain) experienced by a tube. The optical fiber 112 may be fitted to the tube such that strain experienced by the tube is transferred to the optical fiber 112. The strain experienced by the optical fiber 112 may then be measured as described above in order to determine the strain experienced by the tube. Such measurements may be useful in, for example, detecting or predicting damage to the tube. In an embodiment, a series of tubes may be attached to each other, end to end, to form a pipeline, such as a pipeline for transporting a fuel such as a liquid or a gas. The above-described techniques can then be used to monitor the location and magnitude of various strain forces experienced by pipeline and, in this way, the location and severity of damage to individual tubes of the pipeline can be determined. Accordingly, pipeline leak detection can be performed.

It is to be understood that in some embodiments the fiber 112 may include FBGs, for example, when performing interferometry using FBGs. However, in some other embodiments, the fiber 112 may not include FBGs, for example, when performing interferometry using DAS based on Rayleigh scattering.

Optical Interferometry Applied to Pipelines

A pipeline typically comprises a series of connected tubulars. The pipeline is constructed by welding or otherwise bonding those tubulars together while they are above ground; during construction, the pipeline may be supported by one or more temporary stands or directly by the ground. If the pipeline is intended to be buried, after it has been constructed large sections of it are sequentially hoisted with cranes and maneuvered into a trench. Analogously, if the pipeline is intended to be permanently mounted above ground, after being constructed it is hoisted and maneuvered on to permanent stands. Regardless of the pipeline's permanent installation location, hoisting and transporting the pipeline induces mechanical stress in the pipeline and, in particular, in joints along the pipeline at which adjacent tubulars are bonded. Furthermore, once the pipeline is moved to that installation location, ground settling can change the pipeline's support profile, which may induce further mechanical stress. Excessive instantaneous or cumulative stress at a pipeline joint may damage the pipeline such that it immediately develops a leak or becomes more susceptible to developing leaks in the future while in use.

The embodiments described herein use optical interferometry performed using FBGs to monitor the strain experienced by the pipeline, and in particular the pipeline joints. The FBGs are located along optical fiber that is secured to the pipeline and that monitors the pipeline during any one or more of pipeline construction, after the pipeline has been moved to its installation location, and during the transition to the installation location. One or both of instantaneous and cumulative strain may be recorded, and the strain results may be used to determine the likelihood that the pipeline has or likely will develop a leak and whether to perform additional testing on the pipeline, such as pressure testing or a location-specific diagnostic test (e.g., running a pig for detecting cracks or pipeline wall weakening), prior to using it.

Figure 2A:
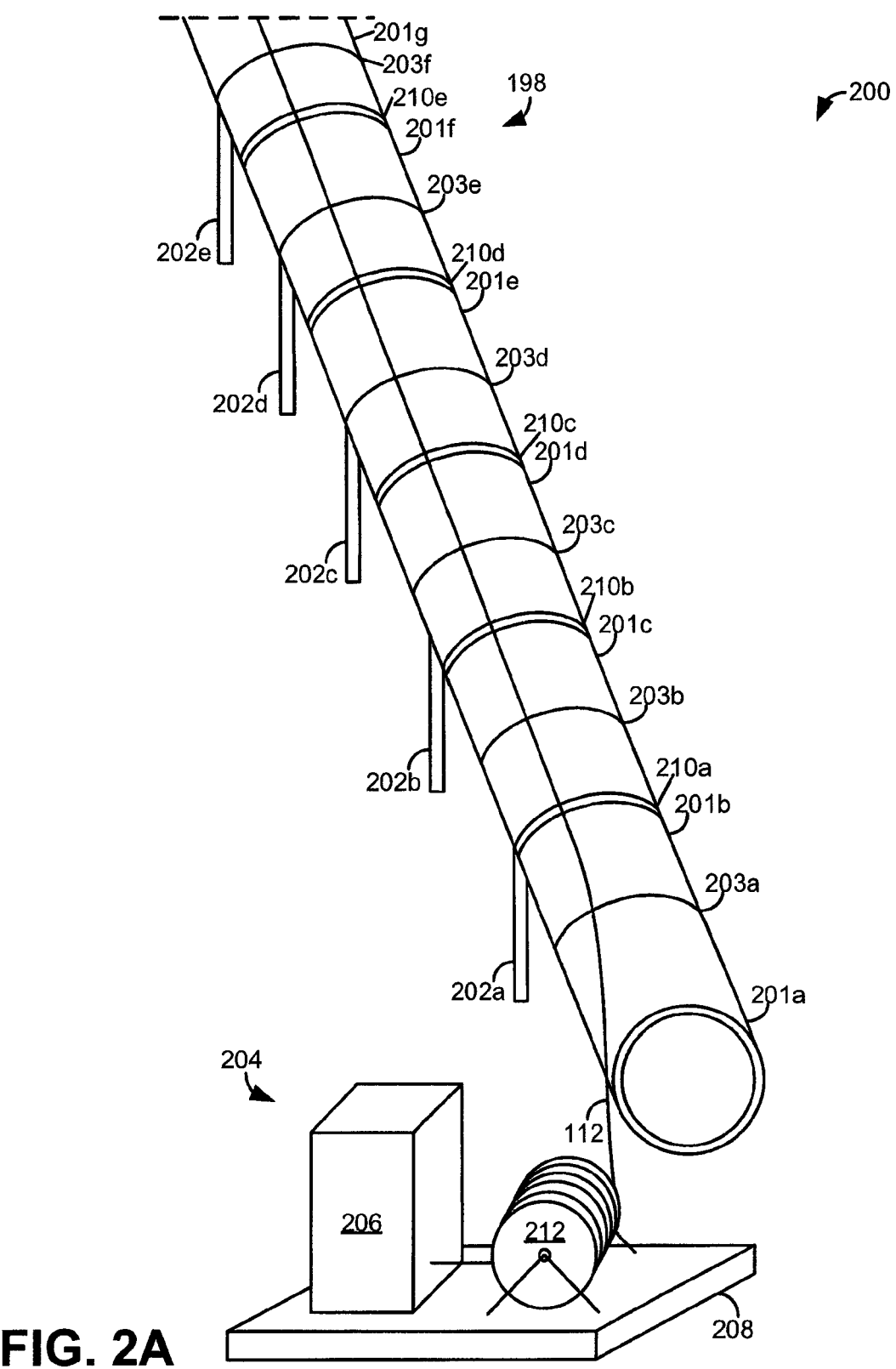
FIGS. 2A and 2B depict embodiments of a system for non-intrusive pipeline testing.
Figure 2B:
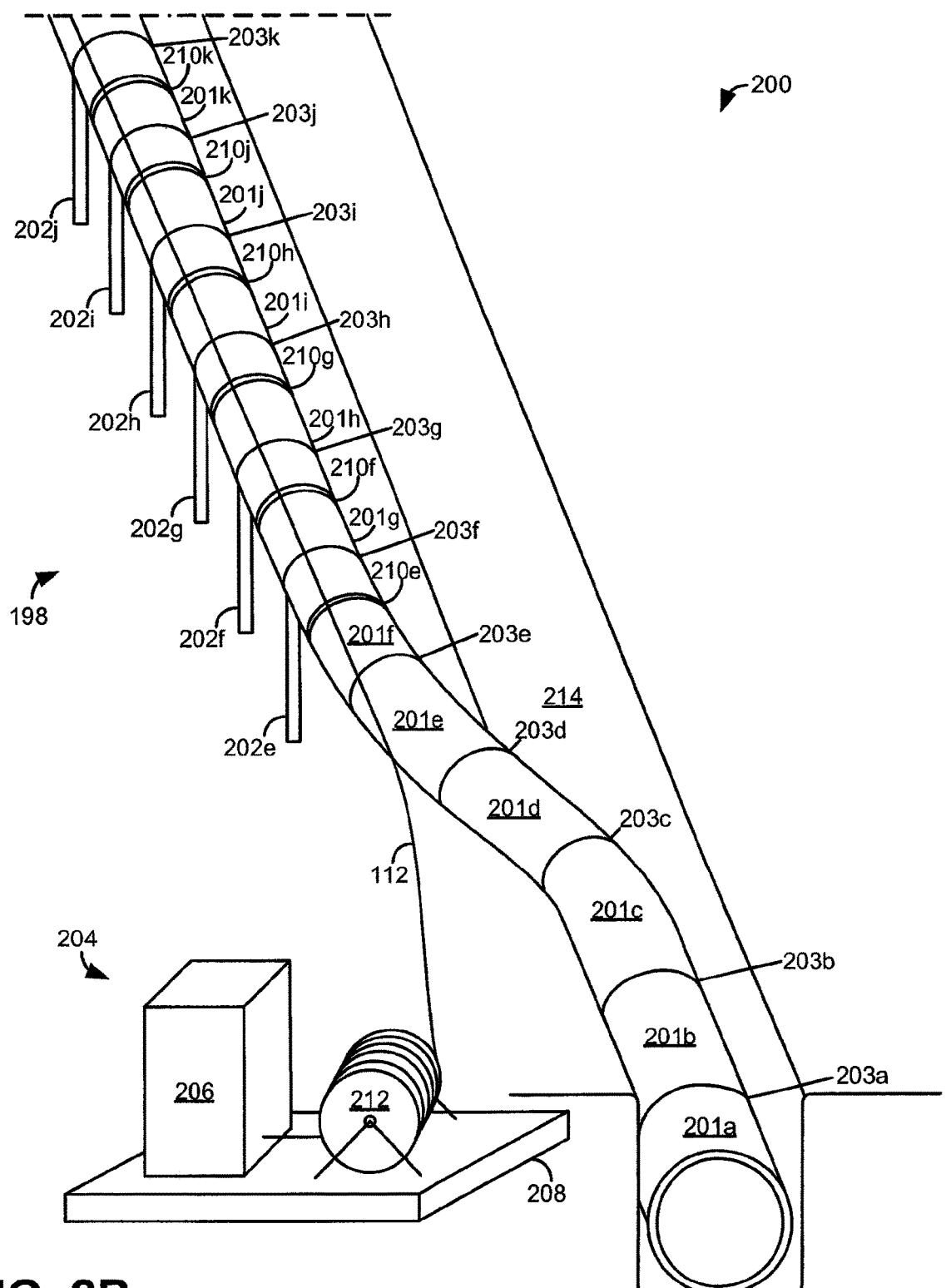

FIGS. 2A and 2B depict an example environment in which an embodiment of a system 200 for non-intrusive pipeline testing operates. A pipeline 198 is constructed from first through eleventh tubulars 201a-k (generally, "tubulars 201", of which only the first through seventh tubulars 201a-g are visible in FIG. 2A and the first through eleventh tubulars 201a-k are visible in FIG. 2B). While the depicted pipeline 198 comprises eleven of the tubulars 201, in different embodiments the pipeline 198 may comprise more or fewer than eleven of the tubulars 201. Each of the tubulars 201 is bonded to one or two adjacent tubulars 201 at first through tenth junctions 203a-j (generally, "junctions 203", of which only the first through sixth junctions 203a-f are visible in FIG. 2A and the first through tenth junctions are visible in FIG. 2B); in FIGS. 2A and 2B, adjacent tubulars 201 are welded to each other, but in different embodiments (not depicted) adjacent tubulars 201 may be secured to each other differently. For example, adjacent tubulars 201 may be screwed together, or the ends of each of the tubulars 201 may be flanged and the flanged ends of adjacent tubulars 201 may be clamped together. The tubulars 201 may be manufactured from any suitable material such as metal or a composite material comprising metal and some other materials.

The pipeline 198 rests on a series of temporary supports 202a-j (generally, "supports 202", of which five of the supports 202a-e are shown in FIG. 2A and six of the supports 202e-j are shown in FIG. 2B), which in turn rest on the ground. In different embodiments (not depicted), the pipeline 198 may rest directly on the ground during construction or may be otherwise supported, such as by hanging using a crane. Extending along the pipeline 198 in FIG. 2A is the optical fiber 112, along which is at least one pair of FBGs 114 tuned to a substantially identical center wavelength. Each fiber segment 116 between any pair of adjacent FBGs 114 with substantially identical center wavelengths is referred to as a "channel" of the system 200. In the depicted example embodiment, the system 200 comprises six channels, with each channel used to monitor dynamic strain experienced by a different one of the junctions 203, the tubulars 201 themselves, or both. Consequently, the fiber 112 comprises six pairs of the FBGs 114; more particularly, the first pair of FBGs 114 comprises a first FBG 114 on the first tubular 201a and a second FBG 114 on the second tubular 201b, thereby permitting monitoring of dynamic strain that the first junction 203a experiences using the first channel; the second pair of FBGs 114 comprises a third FBG 114 on the second tubular 201b and a fourth FBGs 114 on the third tubular 201c, thereby permitting monitoring of dynamic strain that the second junction 203b experiences using the second channel; and so on.

Optionally, one or more of the channels may monitor non-overlapping lengths of the pipeline 198; for example, in one embodiment the first and second FBGs 114 are used to monitor the first junction 203a and the second and third FBGs 114 are used to monitor the second junction 203b, with the first through third FBGs 114 on the first through third tubulars 201a-c, respectively. In this example, the first channel comprises the fiber segment 116 between the first and second FBGs 114 and the second channel comprises the fiber segment 116 between the second and third FBGs 114, and the first and second channels thereby monitor non-overlapping segments of the pipeline 198. In a different embodiment, the first fiber segment 116 may be delineated by the first and second FBGs 114 and the second fiber segment 116 may be delineated by the third and fourth FBGs 114, with the first FBG 114 on the first tubular 201a, the second FBG 114 on the second tubular 201b, the third FBG 114 on the second tubular 201b nearer to the second junction 203b than the second FBG 114, and the fourth FBG 114 on the third tubular 201c.

Additionally, one or more of the channels may monitor overlapping lengths of the pipeline 198. For example, in one embodiment the first fiber segment 116 may be delineated by the first and second FBGs 114 and the second fiber segment 116 may be delineated by the third and fourth FBGs 114, with the first FBG 114 on the first tubular 201a, the second FBG 114 on the second tubular 201b, the third FBG 114 on the second tubular 201b nearer to the first junction 203a than the second FBG 114, and the fourth FBG 114 on the third tubular 201c. In this example, the length of the pipeline 198 between the second and third FBGs comprises part of the first and second channels.

As discussed above in respect of FIG. 1A, the interrogator 106 may interrogate the different channels using one or both of TDM and WDM.

In FIGS. 2A and 2B, the fiber 112 is secured linearly along the pipeline 198. In different embodiments (not depicted), the fiber 112 may be secured according to a different pattern. For example, the fiber 112 may be helically wrapped around the pipeline 198. Additionally or alternatively, the fiber 112 may be wrapped in a serpentine pattern along the pipeline 198. Generally, the fiber 112 may be placed on the pipeline 198 in any pattern that permits dynamic strain experienced by the pipeline 198 to be transferred to one or more of the channels comprising part of the fiber 112.

Contact between the fiber 112 and the pipeline 198 may be direct or indirect. In the depicted embodiment, the fiber 112 is contained within coiled tubing; the coiled tubing directly contacts the pipeline 198 and the fiber 112 accordingly indirectly contacts the pipeline 198. In another embodiment (not depicted), the fiber 112 is laid directly on to the pipeline 198. The fiber 112 may be coated or uncoated or deployed in any suitable format, such as within a small diameter stainless steel tube or wireline cable.

A skid 208 is used to deliver a fiber reel 212 and an electronics package 206 to the location where the pipeline 198 is being constructed; the skid 208, fiber reel 212, and electronics package 206 collectively comprise a portable inspection system 204. Contained within the electronics package's 206 housing are the interrogator 106 and signal processing unit 118. Depending on the embodiment, the electronics package 206 may comprise neither, one of, or both of the display 108 and input device 110. For example, the electronics package may comprise the signal processing unit 118 in the form of a server that is programmed to perform interrogation and to store interrogation results on a non-transitory computer readable medium without need of the display 108 or the input device 110. Alternatively, the electronics package may comprise the signal processing unit 118 in the form of a general purpose computer specifically configured to perform interrogation and to interact with the user on-site via the input device 110 and display 108.

While in FIGS. 2A and 2B the electronics package 206 and reel 212 are delivered on the skid 208, in different embodiments (not depicted) the package 206 and reel 212 may be transported using a different device. For example, the package 206 and reel 212 may be mounted on or within a vehicle that is driven to the installation location; in this example, the portable inspection system 204 may comprise the electronics package 206 and reel 212 but exclude the skid 208.

The fiber 112 is wound on the reel 212, with one end of the fiber 112 coupled to the electronics package 206 and the other end of the fiber 112 extended along at least a portion of the length of the pipeline 198. In FIG. 1, the fiber 112 is secured to the pipeline 198 using first through fifth clamps 210a-e (generally, "clamps 210"), as described in more detail below in respect of FIGS. 3A-6. In FIGS. 2A and 2B, one of the clamps 210 is used for each of the tubulars 201; however, in a different embodiment, more or fewer than one clamp 210 may be used for each of the tubulars 201, for example, a clamp 210 may only be provided for every two or more of the tubulars 201, or each of the tubulars 201 may be provided with two or more clamps 210. In different embodiments (not depicted), the fiber 112 may be secured using any suitable means, such as a clamp other than the examples of FIGS. 3A-6, tape, or an adhesive. In one embodiment, between 100 m and 1 km of the fiber 112 is wound on to the reel 212 prior to being deployed on to the pipeline 198, although in different embodiments any suitable length of the fiber 112 may be used.

Figure 2C:
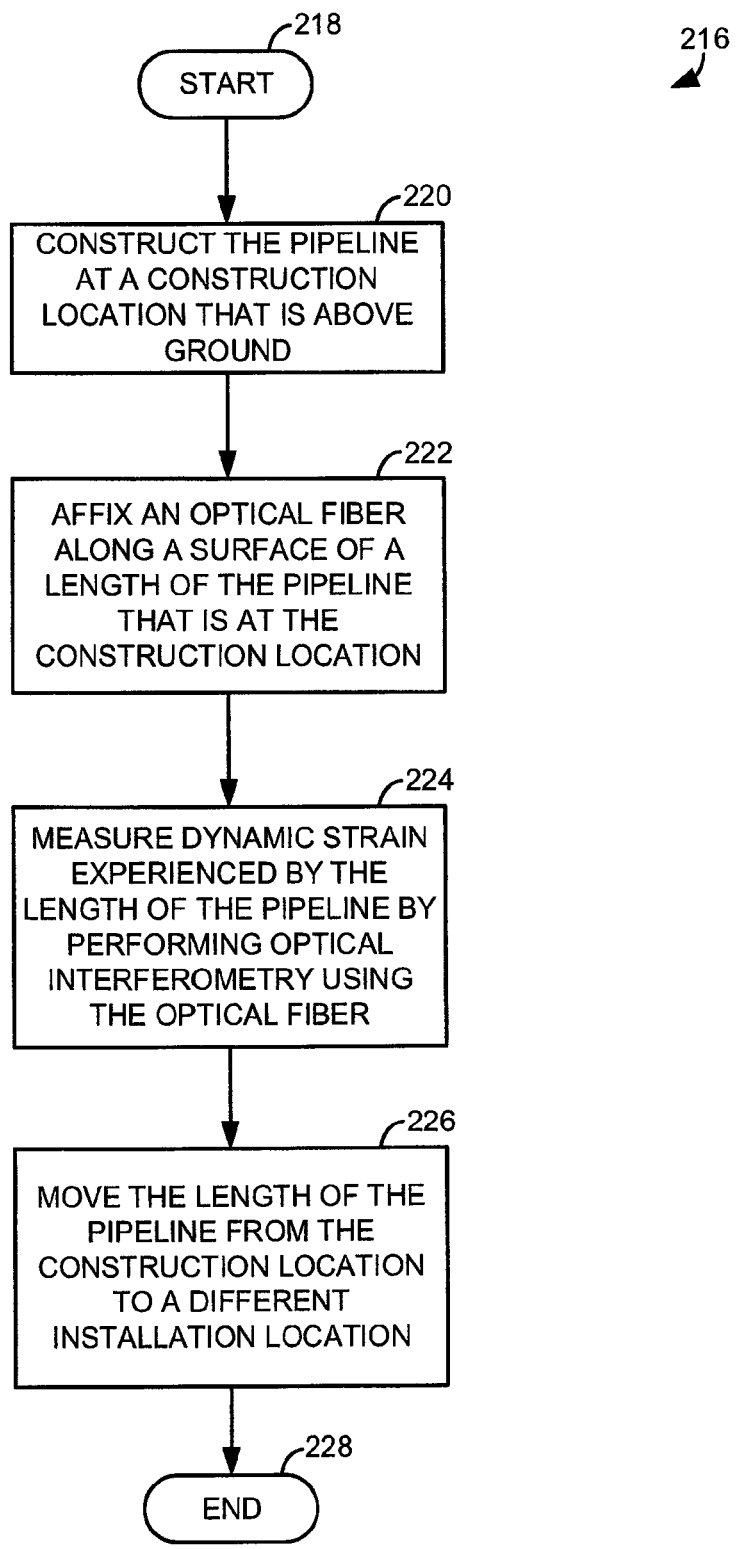
FIG. 2C depicts an embodiment of a method for non-intrusive pipeline testing.

Referring now to FIG. 2C, there is shown a method 216 for performing non-intrusive testing, according to another embodiment. The method 216 begins at block 218 and proceeds to block 220. At block 220, the pipeline is constructed at a construction location that is above ground. The fiber 112 is secured to the pipeline 198 at block 222. The fiber 112 may be secured to each of the tubulars 201 as it is added to the pipeline 198, it may be secured to the entire pipeline 198 after it has been constructed and while it remains on the supports 202, or it may be secured to portions of the pipeline 198 comprising more than one of the tubulars 201 after that portion has been constructed but prior to completion of construction of the entire pipeline 198. In this example embodiment, the fiber 112 is secured to each of the tubulars 201 after it has been added to the pipeline 198 and before a subsequent one of the tubulars 201 is added to the pipeline 198; for example, the fiber 112 is secured to the first and second tubulars 201a,b after they are welded together and before the third tubular 201c is welded to the second tubular 201b. In contrast to securing the fiber 112 after the pipeline 198 has been constructed, this permits the system 204 to monitor strain that the first junction 203a experiences as a result of pipeline construction itself to be monitored. This process continues until the fiber 112 is secured to that portion of the pipeline 198 to be monitored; this may be all or only part of the pipeline 198.

Figure 9:
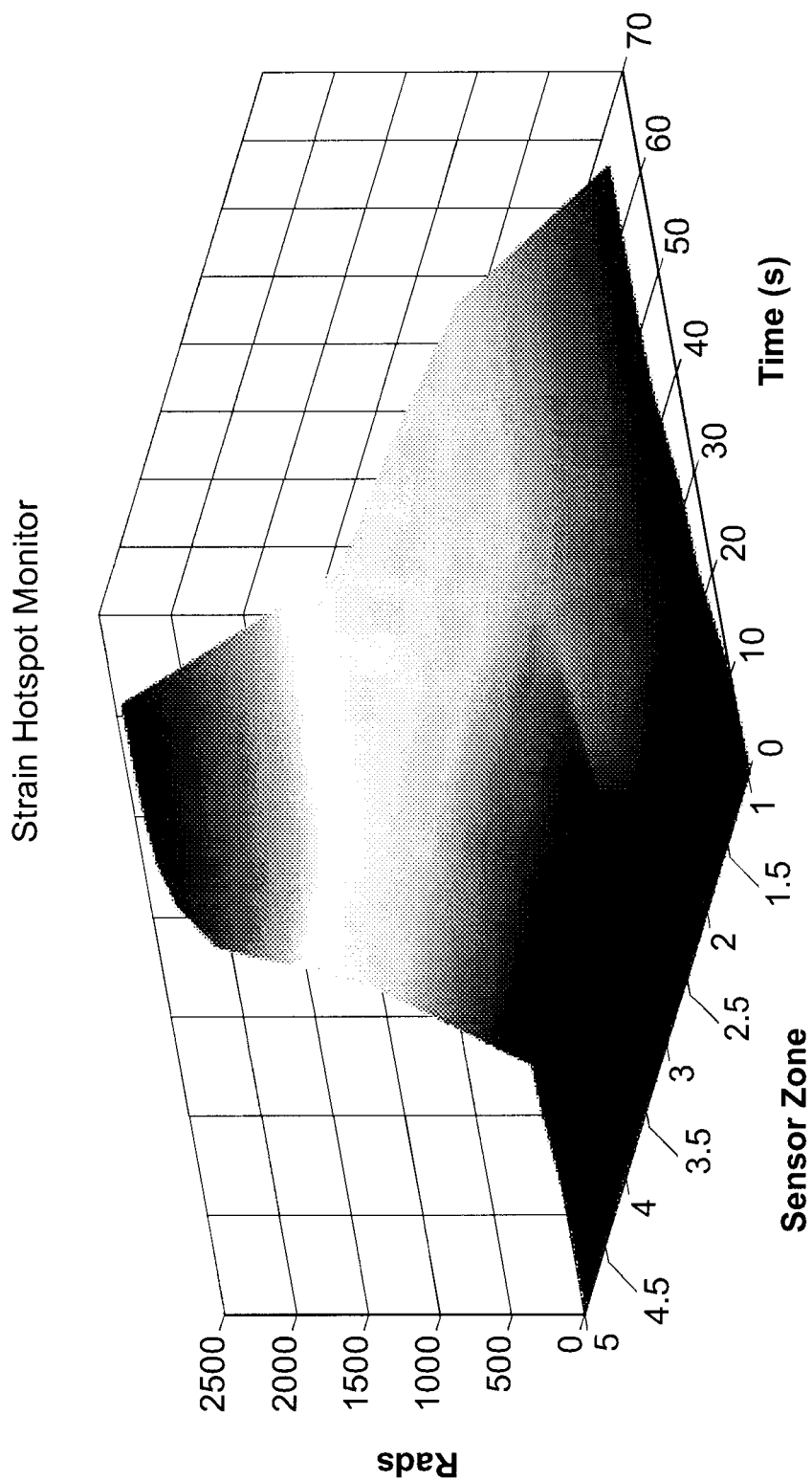
FIG. 9 depicts a graph of cumulative dynamic strain at various locations along an example pipeline vs. time.
Figure 10:
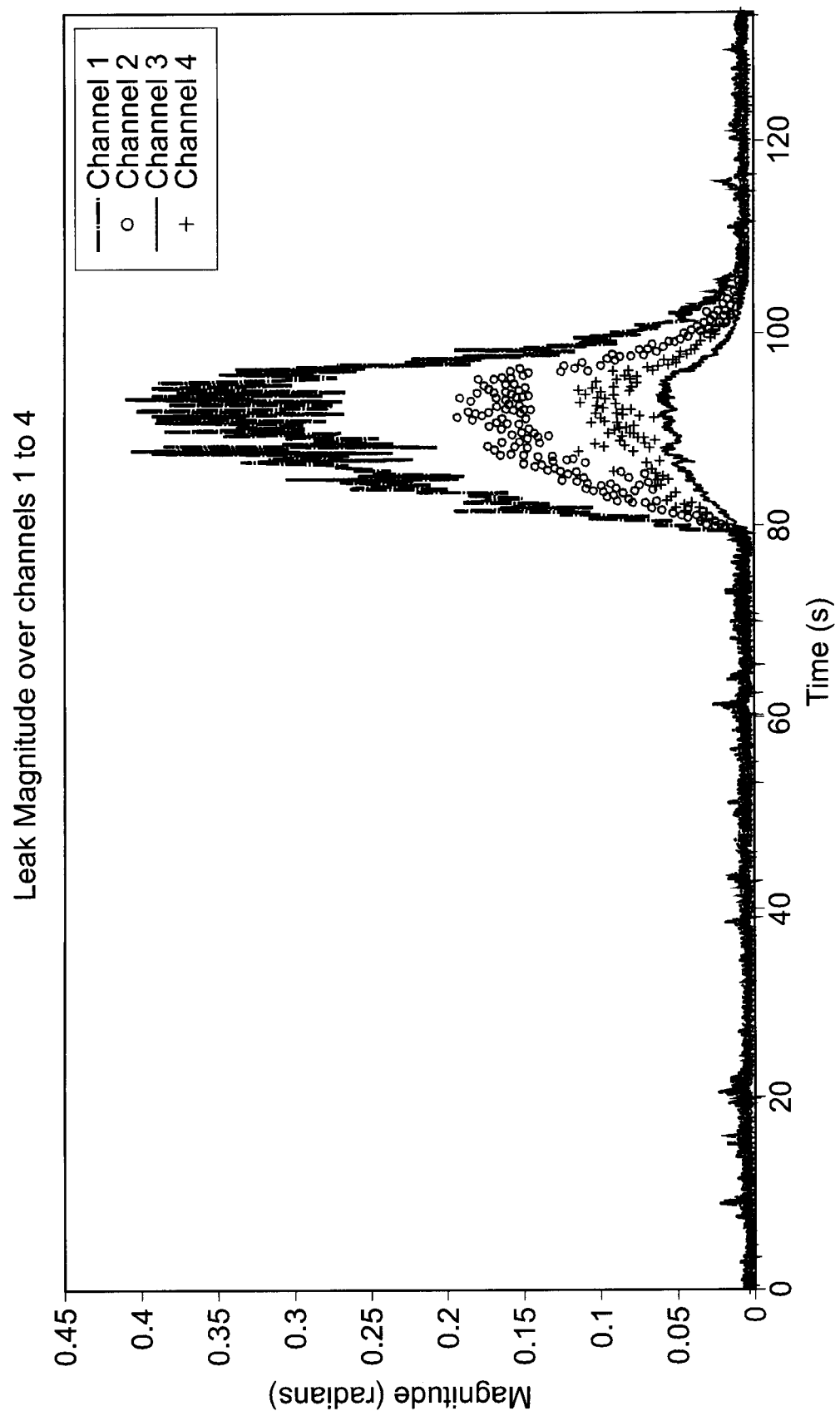
FIG. 10 depicts a graph of magnitude of dynamic strain vs. time for segments of an optical fiber (channels 1-4) linearly affixed along an external surface of the pipeline, each of the segments of the optical fiber extending linearly between a pair of FBGs (channels 1-4).

As discussed in further detail below in respect of FIGS. 9 and 10, at block 224 the system 200 measures dynamic strain experienced by the length of the pipeline 198 to which the fiber 112 is affixed by using optical interferometry. The system 200 may be used to track one or both of instantaneous and dynamic strain experienced by the pipeline 198 during one or more of the pipeline's 198 construction, installation, and operation. Dynamic strain measured in one or more of the tubulars 201 may be an indicator that the tubulars 201 experiencing the strain have been damaged or may be more susceptible to damage in the future. For example, damage could include a slit in the pipeline 198 such that fuel transported by the pipeline 198 is leaking out through the side of one of the tubulars 201 or through one of the junctions 203. A change in magnitude of strain measured using the fiber 112 may indicate stretch, compression, elongation, or shear of one or more of the tubulars 201. The magnitude of strain may also indicate severity of the strain being applied to the tubulars 201; for example, the larger the strain being applied to the tubulars 201, the greater the magnitude of strain. Accordingly, the more severe the strain being applied at a particular location of the pipeline 198, the more likely it is that that portion of the pipeline 198 will be compromised and fail in the future.

The processor 102 comprising part of the electronics package 206 may consequently be configured to interrogate the pipeline 198 to determine the dynamic strain experienced by each of the channels, with each of the channels being mapped to a certain portion of the pipeline 198. For example, each of the channels may be mapped to only one of the junctions 201. The processor 102 may determine one or both of instantaneous dynamic strain measured by the channels and cumulative dynamic strain measured over a period of time (e.g., the entire time the fiber 112 is attached to the pipeline 198; or, only the time the pipeline 198 is any one or more of under construction, being transitioned from the construction to the installation locations, and in the installation location).

Referring now in particular to FIG. 2B and to block 226 of FIG. 2C, after the fiber 112 is secured to the pipeline 198, a crane (not depicted) hoists the pipeline 198 into a trench 214, which is the installation location. FIG. 2B shows the portion of the pipeline 198 comprising the first through fourth tubulars 201a-d in the trench 214 and the remaining tubulars 201 outside of the trench 214. When moving the pipeline 198 from its construction location (on the supports 202) to the trench 214, the crane repeatedly hoists different portions of the pipeline 198 into the trench 214 until the entire pipeline 198 has been installed; in FIG. 2B, the first through fourth tubulars 201a-d have been moved from the pipeline's 198 construction location to the trench 214, with the fifth tubular 201e and subsequent tubulars 201 to be subsequently moved. In the depicted example embodiment, the fiber 112 is removed from the portions of the pipeline 198 prior to their transition to the installation location. In different embodiments, however, the fiber 112 may be removed from those portions of the pipeline 198 after they have been moved to the installation location, or the fiber 112 may be permanently left on the pipeline 198 so the pipeline 198 may be monitored while in normal use. Additionally or alternatively, different portions of the pipeline 198 may be treated differently; for example, the fiber 112 may be left on some of the tubulars 201 permanently (i.e., including after installation of the pipeline 198 is complete), it may be removed from some of the tubulars 201 prior to installation, it may be removed from some of the tubulars 201 after installation, or any combination thereof. After the pipeline 198 is moved from the construction to installation locations, the method 216 ends at block 228.

In one example embodiment, the trench 214 may be a trench in or on the floor of a body of water such as an ocean, lake, or river, and the pipeline 198 may be constructed on a ship such as a barge or on an offshore oil platform and lowered, via a crane, to that trench.

As described above, to perform interrogation the interrogator 106 generates sensing and reference pulses which are transmitted along the optical fiber 112 that comprises at least one pair of FBGs 114 separated by a fiber segment 116. The optical length of the fiber segment 116 varies in response to dynamic strain that the optical fiber 112 experiences caused, for example, by forces resulting from extending the pipeline 198 by adding more of the tubulars 201, ground compaction or settling, or one or more other sources of dynamic strain. The sensing and reference pulses are each partially reflected by the FBGs 114 and return to the interrogator 106 resulting in interference of the reflected sensing and reference pulses as described above with reference to FIGS. 1A and 1B. The interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences. The signal processing device 118 is communicatively coupled to the interrogator 106 to receive the output signal. The signal processing device 118 includes processor 102 and non-transitory computer readable medium 104 that are communicatively coupled to each other as described above with reference to FIG. 1A. The signal processing device 118 processes the output signals received by the interrogator 106 to provide an indication of where in the wellbore the dynamic strain is occurring and this information may be used to identify where the pipeline 198 has been damaged and should be further tested, inspected, or repaired.

When either the instantaneous or cumulative dynamic strains exceeds an alert threshold, the processor 102 may issue an alert to the system's 100 operator; the threshold corresponding to instantaneous dynamic strain measurements is the "instantaneous dynamic strain alert threshold", while the threshold corresponding to cumulative dynamic strain measurements is the "cumulative dynamic strain threshold". In embodiments in which the electronics package 106 comprises the display 108, the alert may be an indicator on the display 108; alternatively or additionally, the alert may be stored on the computer readable medium 104 for later access, such as at the end of a workday. The alert threshold may be the same for both instantaneous and cumulative strain; alternatively, one alert may be used when instantaneous strain is monitored and another, different alert may be used when cumulative strain is monitored.

If the processor 102 issues an alert while the pipeline 198 is being constructed, the person responsible for the pipeline 198 can take appropriate action in response before the pipeline 198 is moved to the trench 214. For example, the responsible person can perform a pressure test on the pipeline 198 prior to lifting it into the trench 214 to confirm the presence or absence of a leak. If a leak is present and repairs are required, the cost and complexity of those repairs may be less than if a leak were detected after installation, and environmental consequences of a leak may be mitigated as well. Repairing the pipeline 198 above ground may also have health and safety benefits for the persons performing the repairs as well.

Additionally or alternatively, the fiber 112 may remain secured on the pipeline 198 even after installation and filling of the trench 214. The system 200 accordingly may be used to monitor dynamic strain experienced by the pipeline 198 resulting from, for example, soil compaction or settlement shortly after installation. In a permanent installation, the system 200 may be constructed to facilitate one or both of adding and splicing of different segments of the fiber 112 together. For example, junction boxes may be periodically spaced along the exterior of the pipeline 198, with spliced portions of fiber 112 being contained within the junction boxes. Additionally or alternatively, the clamps 210 may be used to permanently secure the fiber 112 to the pipeline 198.
Example Clamp FIGS. 3A to 3F illustrate in detail a clamp 210 for clamping the fiber 112 to one of the tubulars 201 in accordance with an embodiment. The clamp 210 includes a body portion 300 and two arms 302a, 302b (generally "arms 302"). Each of the arms 302 has a proximal end portion 306a, 306b and a distal end portion 308a, 308b. Each proximal end portion 306a, 306b is coupled to a different opposing end of the body portion 300 whilst each distal end portion 308a, 308b is free, that is, not coupled to anything.

In an embodiment, the arms 302 are arcuate and, with the body portion 300, are arranged to define a curve of greater than 180 degrees, such as, between 240 degrees and 300 degrees. In this way, the arms 302 and the body portion 300 may define a portion of an ellipse and that portion may account for more than 180 degrees of the ellipse. The ellipse may be a circle but, alternatively, the ellipse may be eccentric (e.g., not a perfect circle). In an embodiment, the shape defined by the arms 302 and the body portion 300 is substantially C-shape.

In the embodiment of FIGS. 3A to 3F, a cross-section of the arms 302 is substantially square shaped. However, in some other embodiments, the cross-section may have a different shape, for example, the cross-section may be substantially triangular or circular.

In an embodiment, the body portion 300 includes a handle 310 and a fiber clamping surface 312. The fiber clamping surface 312 clamps a portion of fiber 112 against the tubular 201 when the clamp 210 is fastened around the tubular 201, as will be described below. Also, as seen more particularly in FIGS. 3A to 3C, the clamping surface 312 may include a groove 314 which is substantially aligned with a longitudinal axis 316 of the clamp 210. The groove 314 may be sized and shaped so that the fiber 112 is completely or only partially contained therein. In this way, the groove 314 may provide an alignment mechanism of the clamp 210. In an embodiment, the groove 314 has a semi-circular cross-section and a diameter of the semi-circle is just larger than a diameter of the fiber 112.

Figure 3F:
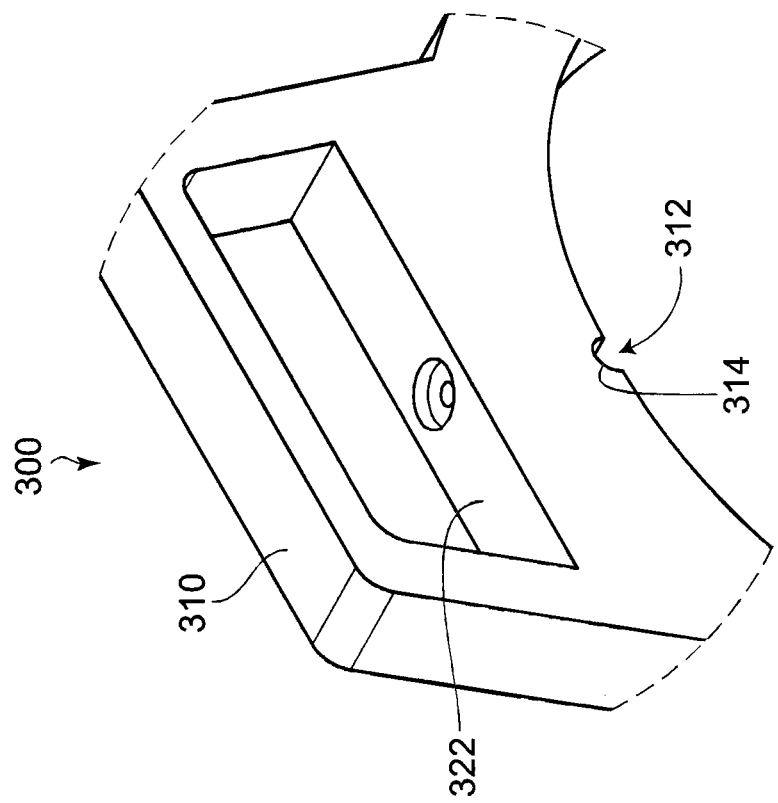
Figure 3B:
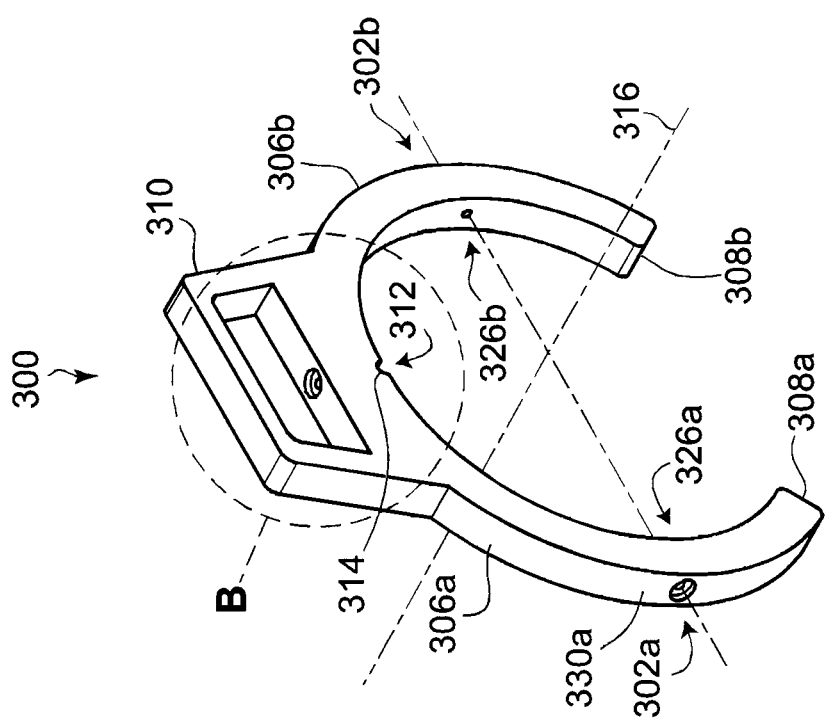
Figure 3C:
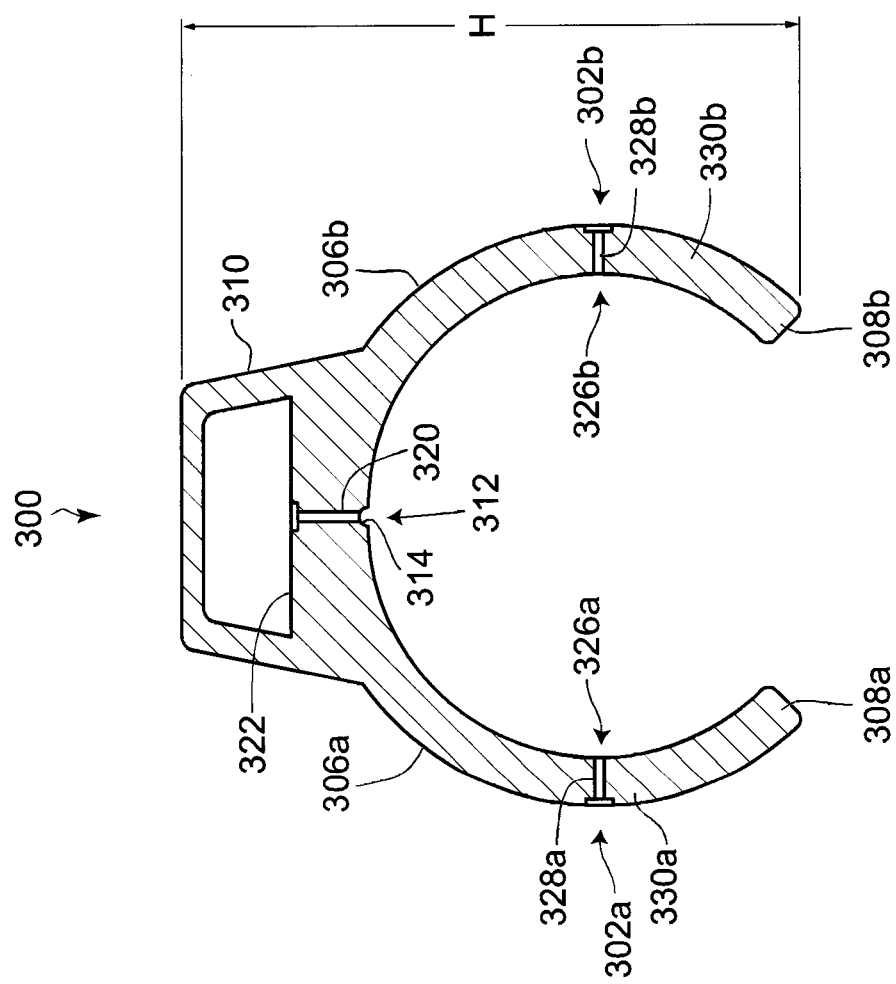

Example dimensions of the embodiment of FIGS. 3A to 3F are as follows: an outer diameter (L) of the C-shape when measured horizontally considering the orientation of FIG. 3A is 400 millimeters and the inner diameter (2R) is 320 millimeters; a thickness (T) of the clamp 210 along the longitudinal axis 316 is 30 millimeters; a height (H) of the clamp 210 when measured vertically considering the orientation of FIG. 3C is 430 millimeters. Accordingly, the clamp 210 may be sized to fit a tubular 201 having an outer diameter of just less than 320 millimeters. It is to be understood that one or more of the dimensions mentioned above may be different in some embodiments. Also, different sizes of clamps may be formed for operation with different sizes of tubes. It is also to be understood that each of these dimensions may have a tolerance of ±5 millimeters.

Figure 3H:
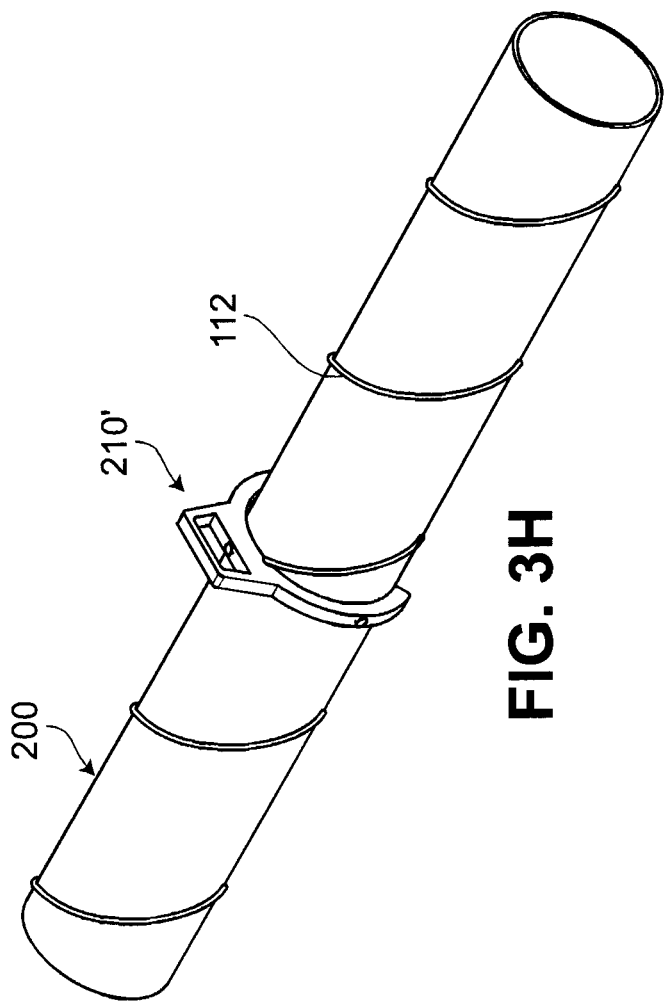
Figure 3G:
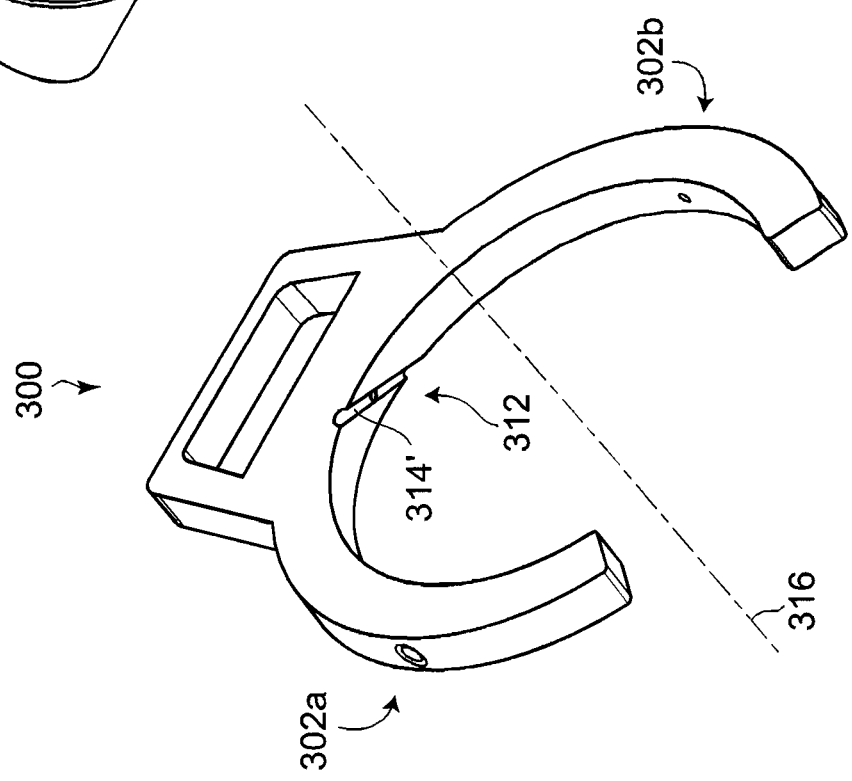
Figure 5A:
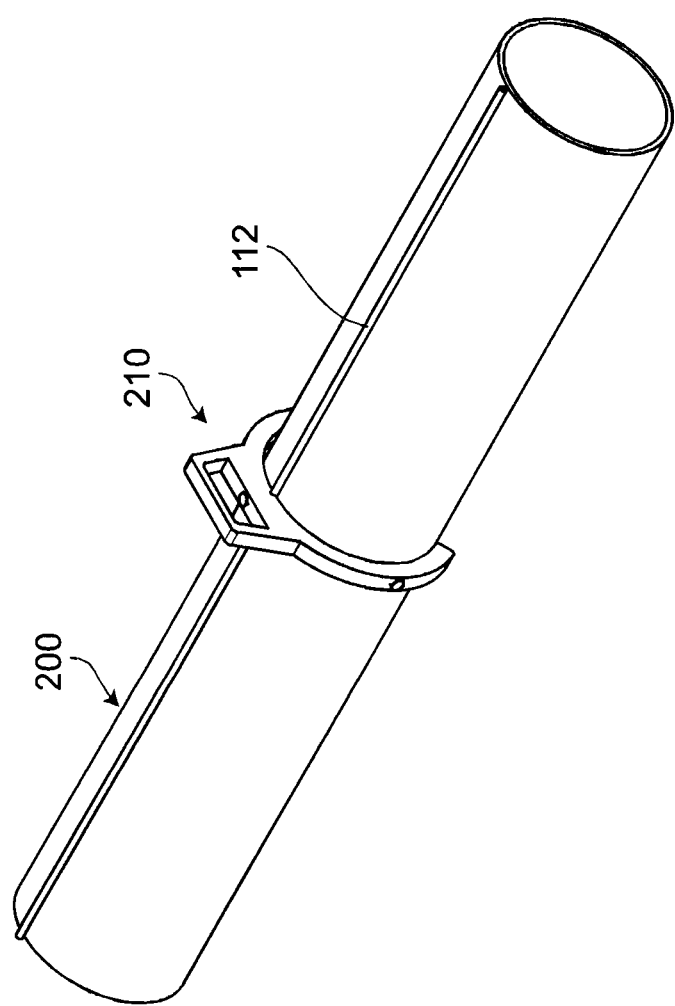

As seen more particularly on FIGS. 3G and 3H, in an embodiment in which the fiber 112 is wrapped around the pipeline 198 in a substantially helical or spiral formation, a modified version of the clamp 210' includes a modified groove 314' that is offset with respect to the longitudinal axis 316. That is, the groove 314' is not in-line with, but is at an angle with respect to, the longitudinal axis 316. In an embodiment, the angle is any value between 2 and 85 degrees, such as, for example, 5 degrees, 10 degrees or 45 degrees.

It is to be understood that in some other embodiments, the arms 302 may not be arcuate or they may have an arcuate portion and a non-arcuate portion. For example, as seen more particularly in FIG. 4A, in one embodiment, the arms 302 include only straight sections with two 90 degree bends and, as such, resemble a "[" shape or "]" shape. As seen more particularly in FIG. 4B, in another embodiment, the arms 302 may generally be curved, but have straight sections at their proximal and distal end portions. In even further embodiments, the arms 302 may have or may include a wave-shaped portion. Whilst the following description is equally applicable to the embodiments of FIGS. 4A and 4B, for clarity, reference will be made only to the embodiment of FIGS. 3A to 3F.

As seen more particularly on FIGS. 5A to 5D, the clamp 210 has a resilient portion to permit the clamp 210 to elastically deform from a closed state in which the clamp 210 is fastened around the tubular 201 to an open state in which the clamp is radially moveable off the tubular 201. It is the application of a force separating (e.g., pushing or pulling apart) the arms 302 which biases the resilient portion and transitions the clamp 210 from the closed state to the open state. Also, the resilient portion returns the clamp 210 from the open state to the closed state when the force is removed or reduced below a threshold. It is the resiliency or elasticity of the resilient portion which causes the clamp to spring-back or recoil from the open state to the closed state on removal of the force.

In the present embodiment, the resilient portion includes the arms 302 and the body portion 300. However, in another embodiment the resilient portion may include only the arms 302 or only the body portion 300. For example, the body portion 300 may be rigid or not deformable and the arms 302 may be resiliently flexible, or the body portion 300 may be resiliently flexible and the arms 302 may be rigid or not deformable. In another embodiment, the resilient portion may include only part of the arms 302 or body portion 300. For example, the resilient portion may include only the proximal end portions 306a,306b of the arms 302 and the remaining portions of the arms 302 may be rigid or not deformable. Alternatively, only the end portions of the body portion 300 which are coupled to the arms 302 may be resiliently flexible and the remaining portion of the body portion 300 may be rigid or not deformable.

In the above described embodiments, the arms 302 do not enclose the complete circumference of the tubular 201. In this way, the clamp 210 may be easier to fit to the tube because the arms 302 may need to be splayed or separated less than if the arms 302 were long enough for the clamp 210 to completely enclose the tubular 201. However, in some embodiments, the arms 302 are one or both of sized and shaped differently so as to completely enclose the tubular 201 cross-section. In this case, the clamp 210 may be less prone to becoming dislodged, for example, when inadvertently hit by a foreign object.

Returning to the present embodiment, the body portion 300 and each of the arms 302 is deformable such that the distal end portions 308a,308b can be forced apart in order to fit the clamp 210 over the tubular 201. Additionally, the body portion 300 and each of the arms 302 is resiliently biased by the force forcing apart the distal end portions 308a,308b such that removal of the force urges the distal end portions 308a,308b towards each other to fasten the clamp 210 around the tubular 201 or to secure the clamp 210 to the tubular 201. In the present embodiment, the resilient portion includes the body portion 300 and the arms 302; however, the body portion 300 and each of the arms 302 may not contribute equally to the resilience or elasticity which causes the clamp 210 to transition from the open state to the closed state when a force pushing apart the arms 302 is removed or reduced. For instance, due to the shape and dimensions of the clamp 210, the arms 302 may contribute more than the body portion 300. Further, the proximal end portions 306a, 306b may contribute more than the remaining portions of the arms 302.

In view of the above, the clamp 210 may be moved between the open configuration and the closed configuration. In the closed configuration, the arms 302 may adopt a shape substantially as shown in FIGS. 3A to 3C. In this configuration, little or no force may be applied to the arms 302 and they may assume their natural unstressed shape. Also, the gap between the distal end portions 308a,308b may be too small for the clamp 210 to fit over the tubular 201. In the open configuration, the distal end portions 308a,308b are forced further apart than as shown in FIGS. 3A to 3C such that the clamp 210 can be fitted over or around the tubular 201. The force may be applied by an operator of the clamp 210 physically pulling the distal end portions 308a,308b apart in opposite directions. Additionally, the force may be applied by pushing the clamp 210 onto the outer surface of the tubular 201 so that the rounded outer surface of the tubular 201 imparts a separating force on the distal end portions 308a,308b. In this latter case, the operator may use the handle 310 to orientate the clamp 210 whilst pushing it onto the tubular 201 as described. The chosen orientation may be to align or at least substantially align the longitudinal axis 316 of the clamp 210 with a longitudinal axis of the tubular 201. In any case, the arms 302 and the body portion 300 may be deformed to fit the clamp 210 over the tubular 201.

Once the clamp 210 has been fitted over the tubular 201 the force on the distal end portions 308a,308b may be reduced or removed. In the case where an operator is forcing the arms 301 apart, the operator may simply remove the force. In the case where the clamp 210 is pushed onto the tubular 201, once half of the cross-section of the tubular 201 is between the arms 302, pushing the clamp 210 further onto the tubular 201 causes a reduction in the separation force applied by the tubular 201 to the distal end portions 308a, 308b until the separation force is reduced to a minimum once the clamp 210 is fully fitted around the tubular 201. In this way, the claim 210 may be snap fitted onto the tubular 201. Whilst the clamp 210 is secured to the tubular 201, the tubular 201 may still impart some separation force on the arms 302 based on the relative dimensions of the clamp 210 and the tubular 201. For example, if the diameter of the curve defined by the body portion 300 and the arms 302 when they are in their natural unstressed rest state is slightly greater than an outer diameter of the tubular 201, little or no separation force will be exerted on the clamp 210 by the tubular 201. On the other hand, if the diameter of the unstressed curve is less than the outer diameter of the tubular 201, some separation force will be exerted on the claim 210 by the tubular 201. In either case, the state of the clamp 210 when it is secured to the tubular 201 is referred to as the closed state. However, depending on the relative dimensions of the clamp 210 and the tubular 201, the closed state will include both a completely closed situation, when the clamp 210 is in its natural unstressed rest state and no separation force is applied to the clamp 210 by the tubular 201, and a partially closed situation, when some separation force is applied to the clamp 210 by the tubular 201.

The deformability and elasticity of the resilient portion (for example, the arms 302 and the body portion 300) may be provided by a material from which the resilient portion is formed. The material may be chosen because its material properties provide sufficient ductility or flexibility for the arms 302 to be positioned around the tubular 201. Additionally, the material may be chosen because its material properties provide sufficient elasticity and tensile strength so that the arms 302 snap back into shape to fasten or secure the clamp 210 to the tubular 201. In an embodiment, the resilient portion is made from spring steel or an injection molded plastic such as high density polyethylene or resin. In another embodiment, the resilient portion is made of any material that can be machined with an additive or subtractive method (e.g., a metal composition), or any material or combination of materials that can be injection molded (e.g., plastics, rubbers, glass filled resins, carbon/composite fiber). In an embodiment, the whole clamp 210 may be made from the same material in order to simplify manufacture. For example, the whole clamp 210 may be fabricated by an injection molding process. In another embodiment in which the clamp 210 includes both a rigid portion and a resilient portion, the material used to form the rigid portion may be different to the material used to form the resilient portion. For example, the rigid portion may be made from any metal whereas the resilient portion may be made of any injection molded element.

In an embodiment, the resilient portion or the clamp 210 is made from a material which can operate in a wide range of different temperatures (e.g. −40 degrees Celsius to 80 degrees Celsius). For example, the material does not become brittle and non-flexible at temperatures down to −40 degrees Celsius. Accordingly, the resilient portion or clamp 210 can be used in a wide variety of different applications and geographical locations.

In an embodiment, the clamp 210 may be fabricated from an electrically insulating material in order to ensure that there is no opportunity for cathodic corrosion of the tubular 201 by the clamp 210.

In another embodiment, for example, in which the resilient portion is provided by only the proximal end portions 306a,306b, an elastic device (e.g., a spring) may provide the resilient property. For example, the whole of the body portion 300 and all of the arms 302 except the proximal end portions 306a,306b may be made of a rigid or non-deformable material. However, both proximal end portions 306a, 306b may include a helical spring or spring-loaded hinge which permits the clamp 210 to elastically deform from the closed state, in which the clamp 210 is fastened around the tube, to the open state, in which the clamp 210 is radially moveable off the tube. In this case, the helical springs or spring-loaded hinges are biased to transition the clamp 210 from the open state to the closed state when a force separating the arms 302 is removed.

Based on the above-described operation of the clamp 210, the clamp 210 may be used to clamp the fiber 112 to the tubular 201. Specifically, the fiber 112 may be positioned linearly against an outer surface of the tubular 201 and a portion of the fiber 112 to be clamped to the tubular 201 may be identified. Next, the clamp 210 may be moved into its open state by forcing apart the arms 302 so that the clamp 210 can be fitted over the identified portion of fiber 112 and the tubular 201. Next, the clamp 210 may be aligned with respect to the fiber 112 such that the clamping surface 312 is adjacent the identified portion of fiber 112 to be clamped. Finally, the clamp 210 may be snapped back into its closed state by the resilient portion by removing the force applied to the arms 302. In this way, the clamp 210 is fastened around the tubular 201 and clamp 210 clamps the identified portion of fiber 112 against the tubular 201.

In an embodiment, the identified portion of fiber 112 is clamped directly to the outer surface of the tubular 201 such that there are no intermediate elements between the portion of fiber 112 and the tubular 201. In this way, loss in the transmission of strain experienced by the tubular 201 to the fiber 112 may be reduced. In another embodiment, one or more intermediate elements may be present between the fiber 112 and the tubular 201, such as, for example, one or more protective layers. In this way, an outer surface of the tubular 201 may be protected from damage. In an embodiment, the fiber 112 is a fiber in metal tube (FIMT).

Additionally, the clamp 210 may be removed from the tubular 201 in order to stop clamping the fiber 112 to the tubular 201. Specifically, the clamp 210 may be moved into its open state by forcing apart the arms 302. Next, the clamp 210 can be removed from the tubular 201 whilst in the open state. Finally, the clamp 210 may be permitted to return to its closed state by removing the force applied to the arms 302. In this way, the clamp 210 can temporarily clamp the fiber 112 to the tubular 201. On the other hand, the clamp 210 can remain in-situ and thereby permanently clamp the fiber 112 to the tubular 201. It is also noted that the clamp 210 may be removed from the tubular 201 simply by holding the handle 310 and pulling the clamp 210 away from the tubular 201. In this way, the tubular 201 exerts a separating force to the arms 302 to transition the clamp 210 from the closed state to the open state.

In view of the above, the clamp 210 provides a permanent or temporary means by which to clamp the optical fiber 112 to the tubular 201. Since the clamp 210 secures to the tubular 201 using only a radial retaining force maintained by the resilient portion, the strength of the fastening is stronger than prior art methods which utilize adhesive tape to secure the fiber 112 to the tubular 201. Also, the outer surface of the tubular 201 is not damaged during the clamping process, that is, no fastening means such as adhesives, screws, bolts or nails are used which could damage an outer surface of the tubular 201. In this regard, it is noted that the tubular 201 may include an outer protective coating which should not be damaged during the clamping process. Further, since the clamp 210 can be snap-fitted to the tubular 201, no additional tools or devices are needed to use the clamp 210 to clamp the fiber 112 to the tubular 201. Furthermore, since the snap fit operation is quick and simple to perform, the clamp 210 is advantageous over more time consuming prior art solutions in which a banding is wrapped completely around the tubular 201 and then secured in place using a locking mechanism.

In an embodiment, the clamp 210 may contain further features for increasing a clamping force applied to the fiber 112 when the fiber 112 is clamped to the tubular 201. In an embodiment, the body portion 300 includes a clamping mechanism which is operable to extend at least part of the clamping surface 312 towards the tubular 201 when the clamp 210 is fastened around the tubular 201 to increase a clamping force applied to the portion of fiber 112 clamped against the tubular 201 by the clamp 210.

As seen more particularly on FIG. 3C, in an embodiment, the clamping mechanism includes a bore 320 formed in the body portion 300. One end of the bore 320 terminates at an aperture in the clamping surface 312 and another end of the bore 320 terminates at an aperture in a surface 322 of the body portion 300 which is opposite to the clamping surface 312. In an embodiment, the aperture in the surface 322 may be countersunk. The clamping mechanism also includes a fastener (not shown) contained within the bore 320. In an embodiment, the fastener may be an elongate fastener, such as, a screw. The fastener may be inserted into the bore 320 through the aperture in the surface 322. Once the fastener is contained within the bore 320, a tip or end portion of the fastener forms a part of the clamping surface 312. In this way, protruding the end of the fastener out of the aperture in the clamping surface 322 causes a portion of the clamping surface 312 to be extended away from the rest of the body portion 300 so that a clamping force applied by the clamping surface 312 can be increased. On the other hand, retracting the end of the fastener towards the handle 310 of the body portion 300 can reduce the clamping force applied by the clamping surface 312. Accordingly, moving the fastener with respect to the bore 320 to vary an amount of the end portion of the fastener which protrudes beyond the aperture in the clamping surface 312 varies a clamping force applied by the clamp 210.

In an embodiment, an outer surface of the fastener and an inner surface of the bore 320 include cooperating screw threads such that rotating the fastener in one direction with respect to the bore 320 extends the end portion of the fastener towards the tubular 201 to increase the clamping force applied by the clamping surface 312. Also, rotating the fastener in the other direction with respect to the bore 320 retracts the end portion of the fastener away from the tubular 201 to decrease the clamping force applied by the clamping surface 312. In this way, the fiber 112 can be clamped to the tubular 201 by simply installing the clamp 210 over the fiber 112 and the tubular 201. Once the clamp 210 is in place, a fastener may be inserted into the bore 320 and screwed-in until the end of the fastener protrudes out of the aperture in the clamping surface 312 and thereby bears onto the fiber 112 to increase the clamping force applied thereto. In the event that the clamping force needs to be reduced, the fastener can be unscrewed until the clamping force applied by the clamping surface 312 has been reduced to the required amount.

In an embodiment, the clamp 210 may contain one or more further clamping surfaces. As seen more particularly in FIG. 3C, the arm 302a may include further clamping surface 326a and the arm 302b may include further clamping surface 326b. The clamping surface 312 and each further clamping surface 326a,326b are each for clamping a different optical fiber. In this way, three different optical fibers may be clamped to the tubular 201 by a single clamp 210, or one optical fiber may be placed in any of the three different locations. Whilst not shown in FIGS. 3A-3C, the clamping surface 326a and/or the clamping surface 326b may have a groove corresponding to the groove 314 of clamping surface 312. In this way, alignment of the clamping surfaces 326a,326b with respect to their respective optical fibers may be simplified.

In an embodiment, each of the arms 302a,302b includes a further clamping mechanism operable to extend at least part of the further clamping surfaces 326a,326b towards the tubular 201 to increase a clamping force applied by the further clamping surfaces 326a,326b. The clamping mechanism associated with each arm 302a,302b may be analogous to the above-described clamping mechanism associated with the body portion 300. In particular, the clamping mechanism of the arm 302a may include a bore 328a formed in the arm 302a. One end of the bore 328a terminates at an aperture in the clamping surface 326a and another end of the bore 328a terminates at an aperture in a surface 330a of the arm 302a which is opposite to the clamping surface 326a. In an embodiment, the aperture in the surface 330a may be countersunk. The clamping mechanism also includes a fastener (not shown) contained within the bore 326a. As before, the fastener may be an elongate fastener, such as, a screw. The fastener may be inserted into the bore 326a through the aperture in the surface 330a. Once the fastener is contained within the bore 328a, a tip or end portion of the fastener forms a part of the clamping surface 326a. In this way, protruding the end of the fastener out of the aperture in the clamping surface 330a causes a portion of the clamping surface 326a to be extended away from the rest of the arm 302a so that a clamping force applied by the clamping surface 326a can be increased. On the other hand, retracting the end of the fastener towards the rest of the arm 320a can reduce the clamping force applied by the clamping surface 326a. Accordingly, moving the fastener with respect to the bore 328a to vary an amount of the end portion of the fastener which protrudes beyond the aperture in the clamping surface 326a varies a clamping force applied by the clamp 210.

In an embodiment, an outer surface of the fastener and an inner surface of the bore 328a include cooperating screw threads such that rotating the fastener in one direction with respect to the bore 328a extends the end portion of the fastener towards the tubular 201 to increase the clamping force applied by the clamping surface 326a. Also, rotating the fastener in the other direction with respect to the bore 328a retracts the end portion of the fastener away from the tubular 201 to decrease the clamping force applied by the clamping surface 326a. In this way, the clamp 210 can be installed over the fiber to be clamped by the arm 302a and the tubular 201. Once the clamp 210 is in place, a fastener may be inserted into the bore 328a and screwed in until the end of the fastener protrudes out of the aperture in the clamping surface 326a and thereby bears onto the fiber to be clamped to increase the clamping force applied thereto. In the event that the clamping force needs to be reduced, the fastener can be unscrewed until the clamping force is reduced to the required amount.

The clamping mechanism of the arm 302a is analogous to the above-described clamping mechanism of the arm 302b. Therefore, the above description applies equally to the clamping mechanism of the arm 302b.

In view of the above, the clamp 210 may contain three clamping surfaces, clamping surface 312 of the body portion 300, clamping surface 326a of the arm 302a, and clamping surface 326b of the arm 302b. Additionally, the clamp 210 can contain three clamping mechanisms, one associated with each of the clamping surfaces 312,326a,326b. In this way, the clamp 210 can be used to claim three different optical fibers to the tubular 201, or place one optical fiber in one of the three different locations. It is to be understood that the three fibers may be linearly arranged around the circumference of the tubular 201 such that each fiber is substantially parallel to the other fibers and in line with a longitudinal axis of the tubular 201. Additionally, the three fibers may be spiraled around the circumference of the tubular 201 such that each fiber remains equally spaced from the other fibers and does not cross over the other fibers.

As seen more particularly in FIGS. 3A to 3C, the clamping surface 312 may be equidistant from both the clamping surfaces 326a,326b. Specifically, the clamping surface 312 may be 90 degrees from each of the clamping surfaces 326a,326b. However, in some other embodiments, the clamping surfaces may be positioned differently on the clamp 210. For example, rather than the clamping surfaces being positioned substantially centrally on their associated element (e.g., the body portion 300, the arm 302a or the arm 302b), one or more of the clamping surfaces may be off-set with respect to the center of its associated element. For example, the clamping surface 326a may be positioned at or close to the distal end portion 308a of the arm 302a, and the clamping surface 326b may be positioned at or close to the distal end portion 308b of the arm 302b. In this way, the clamping surfaces 312,326a,326b may be equally spaced from each other around the circumference of the tubular 201.

It is to be understood that in some embodiments, one or more of the clamping surfaces 312,326a,326b, including their associated clamping mechanisms, may be omitted. For example, the arms 302a,302b may include the clamping surfaces 326a,326b together with their associated clamping mechanisms, but the clamping surface 312 together with its associated clamping mechanism may be omitted. Alternatively, only the clamping surface 312 together with its associated clamping mechanism may be provided. Further, one of the arms 302 may include a clamping surface and associated clamping mechanism but the other arm may not. It is also to be understood that in some embodiments, any one of the body portion 300, the arm 302a and the arm 302b may include more than one clamping surface and associated clamping mechanism. For example, two or more clamping surfaces each with an associated clamping mechanism may be positioned side-by-side on the body portion 300, the arm 302a or the arm 302b. Accordingly, the clamp 210 may be customized to clamp different numbers of optical fibers to the tubular 201.

Figure 6:
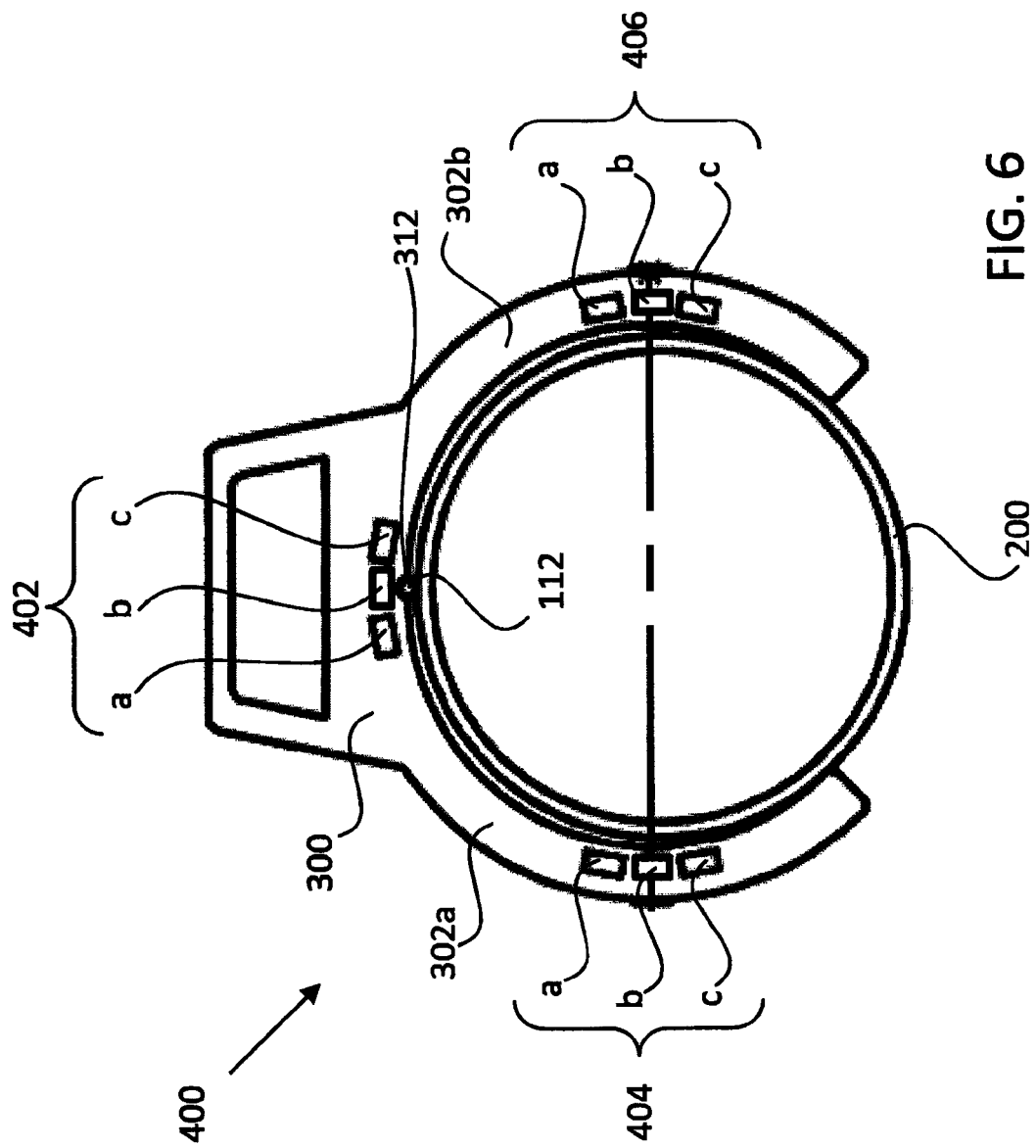
FIG. 6 is a front view schematic that depicts the clamp in accordance with another embodiment.

It is to be understood that in some other embodiments, the clamping mechanism is provided by means other than the bore and fastener arrangement described above. For example, in one other embodiment, a button-actuated ratchet-based mechanism is used to advance or retract a rod or a spring within a bore. Such a mechanism may be similar to that used in mechanical pencils and may be actuated by a spring-loaded button. FIG. 6 illustrates an embodiment in which the clamping mechanism is provided by magnets.

In FIG. 6, a clamp 400 is shown having a similar construction as the above-described clamp 210. It is to be understood that the clamp 400 is the same as the clamp 210 except that that the clamp 400 does not include the above-described fastener and bore type clamping mechanisms. Instead, the clamping mechanisms of clamp 400 include magnets. Specifically, the body portion 300 includes an array 402 of magnets 402a-c; the arm 302a includes an array 404 of magnets 404a-c; and, the arm 302b includes an array 406 of magnets 406a-c. Each array 402 to 406 is completely enclosed in its respective element (e.g. the body portion 300 or the arms 302a,302b). The tubular 201 is magnetic, for example, the tubular 201 is made of a ferrous metal. It is to be understood that magnetic is taken to mean that the tubular 201 is capable of being attracted by a magnet. In use, a force of magnetic attraction pulls the array 402 and tubular 201 together. Since the array 402 is fixed to the body portion 300, the body portion 300 and its associated clamping surface 312 are effectively pulled towards the tubular 201 thereby increasing a clamping force applied by the clamping surface 312. In an embodiment, the array 402 is adjacent to the clamping surface 312. In an embodiment, the array 402 is behind the clamping surface 312 or overlays a portion of clamping surface 312. In this way, the clamping surface is sandwiched in-between the array 402 and the tubular 201 such that the magnetic attraction force squeezes the fiber 112 between the clamping surface 312 and the tubular 201. Accordingly, the array 402 is positioned so as to attract the clamping surface 312 towards the tubular 201. It is to be understood that the same principles apply to the arrays 404 and 406 and, as such, the arrays 404 and 406 function to increase a clamping force applied by the clamping surfaces associated with each of arms 302a,302b. Accordingly, each clamping mechanism of the clamp 400 is provided by one of the arrays 402 to 406. Also, the magnets do not distort the arms 302a,302b or scratch an outer coating of the tubular 201.

In the embodiment of FIG. 6, each array 402 to 406 includes three separate magnets; however, in some other embodiments, one or more of the arrays includes more or less than three magnets, for example, two, five or ten magnets. Further, in one other embodiment, a single magnet is used instead of one or more of the arrays 402 to 406. In the embodiment of FIG. 6, each magnet is substantially oblong or rectangular in cross-section and generally has a rectangular prism shape; however, in another embodiment, one or more of the magnets has a different shape, such as, a cube or a sphere or an arc. In the embodiment of FIG. 6, a separate array is provided on each of the body portion 300, the arm 302a and the arm 302b; however, in another embodiment, one or more of the arrays 402 to 406 may be omitted. Also, in another embodiment, a single array may be formed along a majority of the inside surface of the clamp 400, that is, the surface which abuts the tubular 201. In another embodiment, more than three arrays may be provided on the clamp 400. In the embodiment of FIG. 6, the magnets are completely enclosed in their respective clamp portion (e.g. the body portion 300, the arm 302a or the arm 302b); however, in another embodiment, one or more of the magnets may be only partially enclosed or may protrude from the clamp 400. For example, the magnets may be incorporated into the clamp during an injection molding process. In an embodiment, one or more of the magnets are rare earth magnets.

In an embodiment including an array of magnets, each magnet in the array is selected to provide a different magnetic attraction force to other magnets in the array. For example, a size or material of the magnets may be varied to provide different magnetic attraction forces. In this way, a magnetic attracting force may be maximized at a certain location in the array, for example, an end or the middle of the array.

The following describes another embodiment which is different to the embodiments described above. In this other embodiment, the clamp does not include a clamping mechanism; however, all other aspects of the clamp may be as described above. For example, as before, the clamp includes a body portion coupled at one end to a first arm and at an opposing end to a second arm. The clamp has a resilient portion to permit the clamp to elastically deform from a closed state in which the clamp is fastened around the tube to an open state in which the clamp is radially moveable off the tube. Application of a force separating the first and second arms biases the resilient portion and transitions the clamp from the closed state to the open state and the resilient portion returns the clamp from the open state to the closed state when the force is removed. Further, at least one of the body portion, the first arm and the second arm have a clamping surface to clamp a portion of the optical fiber against the tube when the clamp is fastened around the tube. In an embodiment, the clamping surface may include a groove for receiving the portion of the optical fiber.

In use, the optical fiber may simply be trapped or sandwiched in-between the outer surface of the tube and the clamping surface, such as, for example, on the body portion or one of the arms. Specifically, a portion of the optical fiber may be positioned against the tube. Then, the portion of the optical fiber may be clamped by securing the clamp to the tube over the portion of the optical fiber such that the clamping surface clamps the portion of optical fiber to the tube.

Pipeline Monitoring

As discussed above in respect of FIGS. 2A and 2B, in some of the presently disclosed embodiments, the optical fiber 112 is linearly affixed along a surface of a length of the pipeline 198 to detect dynamic strain of the pipeline 198. The optical fiber 112 including the various channels (i.e., fiber segments 116 positioned between pairs of FBGs 114 tuned to substantially identical center wavelengths) longitudinally extends along the surface of the pipeline 198 with the fiber segments 116 linearly affixed along the pipeline's 198 surface. When the pipeline 198 is subjected to dynamic strain caused by movement or impact during construction or transition from the construction to the installation locations, for example, this results in corresponding strain or pull on the fiber segments 116. The optical length of the fiber segment 116 varies in response to the amount of strain the fiber 112 is experiencing and thus changes the interference pattern produced by the FBGs 114 and recorded by the interrogator 106 as discussed above in respect of FIGS. 1A-1C in more detail. The fiber 112 may be linearly affixed along substantially the whole length of the pipeline 198 or a portion thereof. The fiber 112 may be linearly affixed to the external or internal surface of the pipeline 198. The fiber 112 may be in direct contact with the pipeline's 198 surface or it may be on or embedded in some sort of lining or carrier on the internal or external surface of the pipeline 198. The pipeline's 198 surface may comprise a longitudinally extending linear groove along a length of the pipeline 198 surface and the optical fiber 112 may be positioned in the groove. A protective coating or filler may be provided over the optical fiber 112 to fill any space within the groove and to protect the fiber 112 from damage. Alternatively or additionally the optical fiber 112 may be enclosed in a protective shell for example a metal tube such as a stainless steel tube. The optical fiber 112 (optionally enclosed in the protective shell) may be linearly affixed to the pipeline 198 or lining by a plurality of fasteners, such as zip or cable ties, tape, cable clips, cable mounts or the like.

In one embodiment, another pipeline (an "interior pipeline", not depicted) may extend along the interior of the pipeline 198, and the fiber 112 may be laid on or in a lining of the interior pipeline. The interior pipeline and its lining may be spaced from the internal surface of the pipeline 198; alternatively, that lining may be in contact with and optionally compressed between the internal surface of the pipeline 198 and the external surface of the interior pipeline. In one example embodiment, the lining of the interior pipeline comprises one or more of a fiber wrap, pulling tapes, retention windings, and an outer cover. In another embodiment, the fiber 112 may be laid along the internal surface of the interior pipeline or, alternatively, on or in a lining extending along the internal surface of the interior pipeline, regardless of whether a lining is present between the internal surface of the pipeline 198 and the external surface of the interior pipeline. In another embodiment, no lining is present between the interior pipeline and the pipeline 198, and the fiber 112 is laid between the internal surface of the pipeline 198 and the external surface of the interior pipeline; for example, the fiber 112 may be laid on the internal surface of the pipeline 198, on the external surface of the interior pipeline, or be in contact with both of the internal surface of the pipeline 198 and the external surface of the interior pipeline.

As the optical fiber 112 is linearly affixed along a surface of the pipeline 198, the optical fiber 112 may be enclosed in a protective shell such as a stainless steel tube as described above and the protective shell may be of a thickness and stiffness that reduces or does not permit bending of the optical fiber 112 in order to protect the optical fiber 112. In one example embodiment, the optical fiber 112 is enclosed within a ¼ inch stainless steel tubing.

Figure 7:
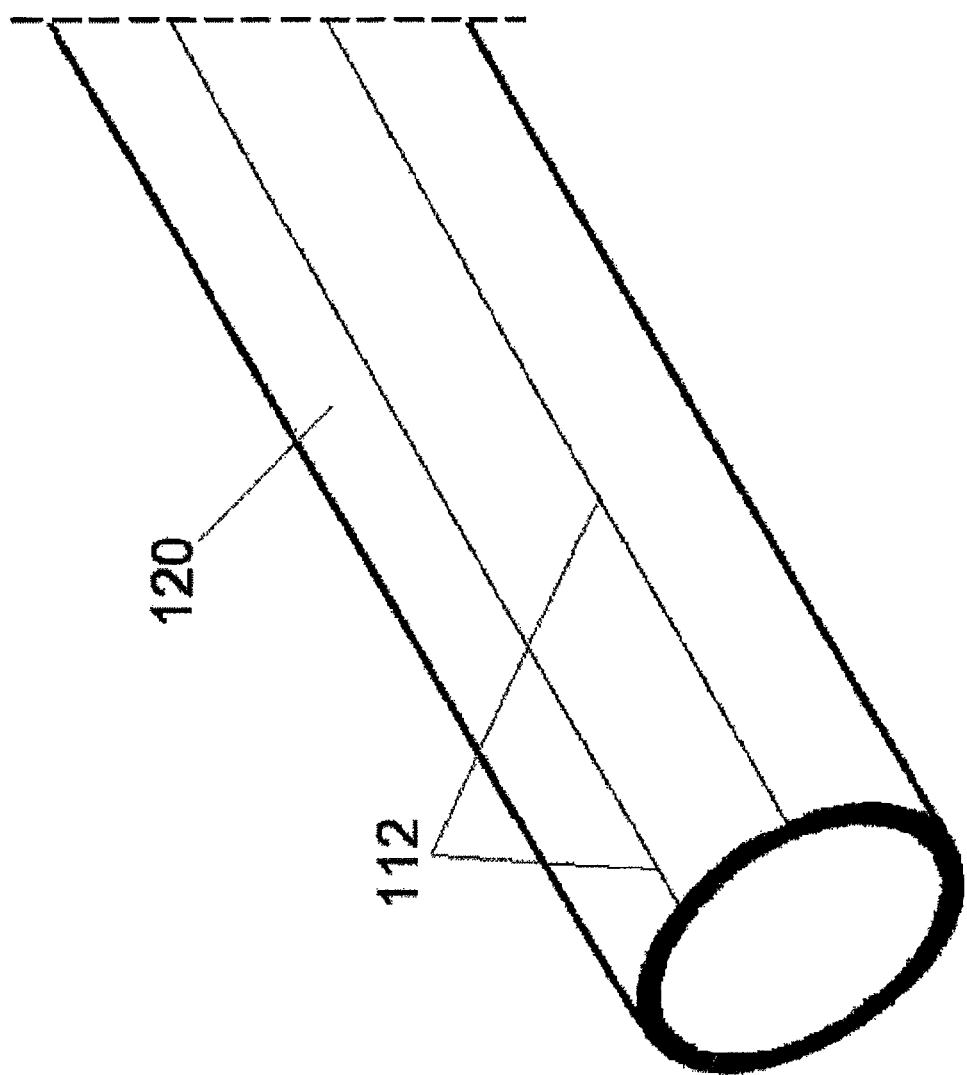
FIG. 7 is a perspective view of the pipeline with multiple optical fibers linearly affixed in parallel alignment to an outer surface of the pipeline for performing non-intrusive testing of the pipeline according to another embodiment.

As shown in FIGS. 2A and 2B, a single fiber 112 may extend linearly along the pipeline 198. As shown in FIG. 7, multiple optical fibers 112 are in longitudinal parallel alignment around the circumference of the pipeline 198, with each optical fiber 112 linearly affixed along the outer surface of the pipeline 198. In an alternative embodiment (not shown), multiple optical fibers 112 may be linearly affixed along the internal surface of the pipeline 198 or other housing with the fibers 112 being in longitudinal parallel alignment. Providing multiple optical fibers 112 positioned in longitudinal parallel alignment along the surface of the pipeline 198 may provide more comprehensive detection of dynamic strain from the area surrounding the internal or internal surface of the pipeline 198 as the dynamic strain will be detected by optical fiber 112 in closest alignment with the source of the dynamic strain.

Figure 8:
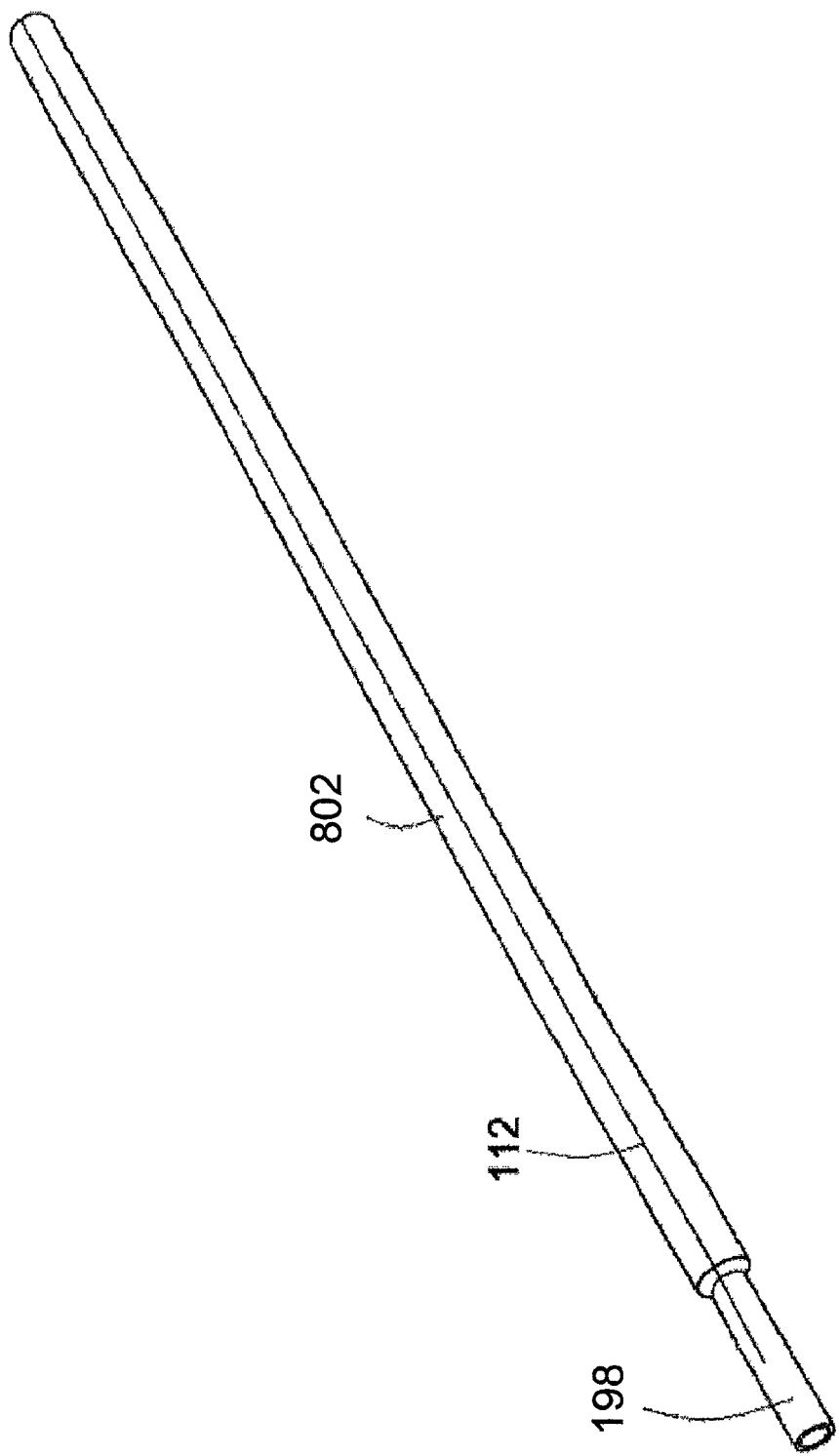
FIG. 8 is a perspective view of the pipeline with a lining surrounding the pipeline and an optical fiber linearly affixed to the lining for detecting dynamic strain of the pipeline, according to another embodiment.

Referring now to FIG. 8, there is shown an embodiment of the pipeline 198 with a lining or carrier 130 surrounding the pipeline 198 and optical fiber 112 linearly embedded in the lining 130. The lining 130 may be extruded over the pipeline 198 or wrapped or laid around the external surface of the pipeline 198. Alternatively, the lining 130 may be positioned on the internal surface of the pipeline 198. The lining 130 includes a longitudinally extending linear groove in the outer surface of the lining 130. The groove receives the optical fiber 112 and a protective filler or coating (not shown) may be coated over the fiber 112 to fill any spaces within the groove. In an alternative embodiment (not shown), the filler may not be provided. The depth of the groove is such that the fiber 112 is below or flush with the outer surface of the lining 130, which, together with the protective coating 132, may beneficially protect the fiber 112 and may prevent snagging of the fiber 112. In another alternative embodiment, the groove may not be provided on the surface of the lining 130 and the optical fiber 112 may be linearly affixed directly to the lining surface or embedded in the lining 130 in some other way, such as extruding the lining 130 with the fiber 112.

The lining 130 may be made of a material that is able to transmit dynamic strain, so as not to hinder the fiber's ability to detect dynamic strain of the housing. The lining material selected should also have sufficient tensile strength to allow the material to be stretched in response to dynamic strain without breaking or failing. Suitable materials for the lining 130 include, but are not limited to, plastics, for example high temperature and formable plastics. The filler or coating may be a formable or curable material, such as a formable plastic, or a thermoset, thermoplastic or UV cured elastomer, which can expand to fill the groove. The filler material selected may have a coefficient of expansion corresponding to the coefficient of expansion of the lining material.

The system 200 and method disclosed herein may be used to monitor changes in frequency of dynamic strain of the pipeline 198. Additionally or alternatively, the system 200 may be used to monitor changes in magnitude of dynamic strain of the pipeline 198. A change in magnitude of dynamic strain may indicate stretch, compression, elongation or shear of the pipeline 198. The magnitude of dynamic strain may also indicate severity of the strain being applied to the pipeline 198, for example, the larger the strain being applied to the pipeline 198, the greater the magnitude of dynamic strain. It follows that the more severe the strain being applied at a particular location of the pipeline 198, the more likely the pipeline 198 will be compromised and fail in the future.

The system 200 and method disclosed herein may be used to monitor cumulative strain of the pipeline 198 where the dynamic strain is monitored over time. FIG. 9 shows an example graph of cumulative dynamic strain at various locations along the pipeline 198 vs. time. The cumulative dynamic strain represented by the graph is measured using an optical fiber 112 comprising pairs of FBGs 114 representing five sensor zones/channels (channels 1-5). The channels and time are given on the horizontal axes and the vertical axes shows the total accumulated strain (rads). For the first five seconds, the pipeline 198 is under no strain. Strain is first applied to channel 1 (hence the initial rise in the cumulative strain in this zone). Then at about ten seconds, strain is applied to channel 5, resulting in an increase in the accumulated strain in channel 5. No further strain is introduced to the system 200, resulting in a leveling off of the accumulated strain graph. Strain is a unitless measurement and is relative rather than absolute. As such, the system 200 may be calibrated and strain correlated to a recognized measurement such as displacement or applied force or pressure. As mentioned above in respect of FIGS. 2A and 2B, cumulative strain may be used to provide an indication of when it is time to perform additional testing (e.g., a pressure test), to perform a repair, or to sound an alert, by comparing the strain value to a threshold.

The system 200 and method may be used to estimate where along the pipeline 198 the dynamic strain is occurring. This may be useful to provide an indication of where the pipeline 198 is damaged and a leak is likely to occur. FIG. 10 shows an example graph of magnitude of strain (radians) over time for different fiber segments 116 (channels 1-4) of an optical fiber 112 linearly affixed along an external surface of the pipeline 198. The greatest magnitude of strain is detected by the channel 3 fiber segment with channel 2 fiber segment and channel 4 fiber segment positioned either side of channel 3 fiber segment having the next largest magnitude of strain. Channel 1 fiber segment is furthest away from channel 3 fiber segment and has the smallest magnitude of strain. This graph indicates that there is dynamic strain in the vicinity of where the channel 3 fiber segment is affixed to the pipeline 198. The dynamic strain may indicate that the pipeline 198 has been damaged during construction or transition to the installation location. This dynamic strain is transient (instantaneous) causing a spike in the magnitude of dynamic strain.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for non-intrusive pipeline testing, the method comprising:
   (a) constructing the pipeline at a construction location that is above ground;
   (b) affixing an optical fiber along a surface of a length of the pipeline that is at the construction location, wherein the optical fiber comprises at least one pair of fiber Bragg gratings ("FBGs") tuned to reflect substantially identical wavelengths with a segment of the optical fiber extending between the FBGs;
   (c) measuring dynamic strain experienced by the length of the pipeline by performing optical interferometry using the optical fiber;
   (d) after measuring the dynamic strain experienced by the length of the pipeline, removing the optical fiber from the length of the pipeline; and
   (e) after removing the optical fiber from the length of the pipeline, moving the length of the pipeline from the construction location to a different installation location.

2. The method of claim 1 wherein the installation location comprises a trench.

3. The method of claim 1 wherein the fiber extends substantially linearly along the length of the pipeline.

4. The method of claim 1 wherein the fiber is helically wrapped around the pipeline.

5. The method of claim 1 wherein the pipeline comprises at least two tubulars attached together at a junction, and wherein the optical fiber is overlaid on the junction.

6. The method of claim 1 wherein the dynamic strain that is measured comprises an instantaneous dynamic strain measurement, and further comprising:
   (a) determining whether the instantaneous dynamic strain measurement exceeds an instantaneous dynamic strain alert threshold; and
   (b) when the instantaneous dynamic strain measurement exceeds the instantaneous dynamic strain alert threshold, generating an instantaneous dynamic strain alert.

7. The method of claim 1 wherein the dynamic strain that is measured comprises a cumulative dynamic strain measurement, and further comprising:
   (a) determining whether the cumulative dynamic strain measurement exceeds a cumulative dynamic strain alert threshold; and
   (b) when the cumulative dynamic strain measurement exceeds the cumulative dynamic strain alert threshold, generating a cumulative dynamic strain alert.

8. The method of claim 1 wherein the optical fiber is affixed to the pipeline while the pipeline is being constructed.

9. The method of claim 1 wherein the optical fiber comprises first and second pairs of the FBGs, wherein the FBGs of the first pair are tuned to a first wavelength and the FBGs of the second pair are tuned to a second wavelength different from the first wavelength.

10. The method of claim 1 wherein the optical fiber extends along an interior of the pipeline.

* * * * *